United States Patent
Sato et al.

(10) Patent No.: US 10,097,804 B2
(45) Date of Patent: Oct. 9, 2018

(54) IMAGE PROCESSING DEVICE, IMAGING DEVICE, INFORMATION PROCESSING DEVICE, AND IMAGE PROCESSING METHOD

(71) Applicant: SONY CORPORATION, Tokyo (JP)

(72) Inventors: Yasushi Sato, Kanagawa (JP); Masatsugu Fukunaga, Kanagawa (JP); Ping Wah Wong, San Jose, CA (US)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/320,409

(22) PCT Filed: Apr. 2, 2015

(86) PCT No.: PCT/JP2015/060457
§ 371 (c)(1),
(2) Date: Dec. 20, 2016

(87) PCT Pub. No.: WO2016/002283
PCT Pub. Date: Jan. 7, 2016

(65) Prior Publication Data
US 2017/0163954 A1    Jun. 8, 2017

(30) Foreign Application Priority Data
Jun. 30, 2014    (JP) .................. 2014-134026

(51) Int. Cl.
*H04N 9/73*    (2006.01)
*G06K 9/46*    (2006.01)
(Continued)

(52) U.S. Cl.
CPC ........... *H04N 9/735* (2013.01); *G06K 9/2018* (2013.01); *G06K 9/2027* (2013.01);
(Continued)

(58) Field of Classification Search
CPC ...... G06K 9/4652; H04N 5/332; H04N 9/735; H04N 5/23232
See application file for complete search history.

(56) References Cited

U.S. PATENT DOCUMENTS

| | | | |
|---|---|---|---|
| 2008/0079807 A1* | 4/2008 | Inuiya | A61B 1/042 348/70 |
| 2009/0294666 A1* | 12/2009 | Hargel | G01J 5/0014 250/330 |
| 2012/0229650 A1* | 9/2012 | Matthews | G06K 9/6289 348/164 |

FOREIGN PATENT DOCUMENTS

| | | |
|---|---|---|
| JP | 2002-142228 A | 5/2002 |
| JP | 2007-288549 A | 11/2007 |

(Continued)

*Primary Examiner* — Ahmed A Berhan
(74) *Attorney, Agent, or Firm* — Chip Law Group

(57) ABSTRACT

Improvement of image quality is realizable. An adding unit generates a summed value corresponding to a sum of all values of respective pixel signals of a plurality of first pixels each of which has sensitivities to visible light and invisible light. The values are weighted by first weighting coefficients that are different from each other and determined such that a difference between a sum of the sensitivities of the first pixels to the visible light and a sensitivity of a second pixel to the visible light, which second pixel has sensitivities to the visible light and the invisible light, becomes smaller than a predetermined tolerance in a state that the sensitivities of the first pixels to the visible light are weighted by the first weighting coefficients and that the sensitivity of the second pixel to the visible light is weighted by a second weighting coefficient. A weighting processing unit weights a pixel signal of the second pixel by the second weighting coefficient. An invisible light component generation unit generates, as a component of the invisible light within each of the (Continued)

pixel signals, a difference between the weighted pixel signal of the second pixel and the summed value.

15 Claims, 29 Drawing Sheets

(51) Int. Cl.
| | |
|---|---|
| *G06K 9/20* | (2006.01) |
| *H04N 9/77* | (2006.01) |
| *G06K 9/62* | (2006.01) |
| *H04N 9/07* | (2006.01) |
| *G06T 5/50* | (2006.01) |
| *H04N 5/232* | (2006.01) |
| *H04N 5/235* | (2006.01) |
| *H04N 5/33* | (2006.01) |
| *G06T 5/00* | (2006.01) |
| *H04N 9/04* | (2006.01) |

(52) U.S. Cl.
CPC ......... *G06K 9/4647* (2013.01); *G06K 9/4652* (2013.01); *G06K 9/4661* (2013.01); *G06K 9/623* (2013.01); *G06T 5/009* (2013.01); *H04N 9/045* (2013.01); *H04N 9/07* (2013.01); *H04N 9/77* (2013.01); *G06T 2207/10024* (2013.01); *G06T 2207/10048* (2013.01); *H04N 2209/045* (2013.01)

(56) References Cited

FOREIGN PATENT DOCUMENTS

| | | |
|---|---|---|
| JP | 2008-085807 A | 4/2008 |
| JP | 2008-289000 A | 11/2008 |
| JP | 2012-124760 A | 6/2012 |
| JP | 2013-106277 A | 5/2013 |

\* cited by examiner

FIG. 6a

$$\begin{pmatrix} R \\ G \\ B \\ IR \end{pmatrix} = \begin{pmatrix} K_{11} & K_{12} & K_{13} & K_{12} \\ K_{21} & K_{22} & K_{23} & K_{24} \\ K_{31} & K_{32} & K_{33} & K_{34} \\ K_{41} & K_{42} & K_{43} & K_{44} \end{pmatrix} \begin{pmatrix} R_{+IR} \\ G_{+IR} \\ B_{+IR} \\ W_{+IR} \end{pmatrix}$$

FIG. 6b

$$\begin{pmatrix} R \\ G \\ B \\ IR \end{pmatrix} = \begin{pmatrix} 0.5990275 & -0.45051 & -0.66262 & 0.582481 \\ -0.449838 & 0.595964 & -0.64036 & 0.605876 \\ -0.530649 & -0.4228 & -0.393077 & 0.617824 \\ 0.4202613 & 0.393446 & 0.569111 & -0.57222 \end{pmatrix} \begin{pmatrix} R_{+IR} \\ G_{+IR} \\ B_{+IR} \\ W_{+IR} \end{pmatrix}$$

FIG. 10a

| $W_{+IR}$ | $G_{+IR}$ | $W_{+IR}$ | $G_{+IR}$ |
| --- | --- | --- | --- |
| $B_{+IR}$ | $W_{+IR}$ | $R_{+IR}$ | $W_{+IR}$ |
| $W_{+IR}$ | $G_{+IR}$ | $W_{+IR}$ | $G_{+IR}$ |
| $R_{+IR}$ | $W_{+IR}$ | $B_{+IR}$ | $W_{+IR}$ |

FIG. 10b

| $W_{+IR}$ | $W_{+IR}$ | $W_{+IR}$ | $W_{+IR}$ |
| --- | --- | --- | --- |
| $W_{+IR}$ | $W_{+IR}$ | $W_{+IR}$ | $W_{+IR}$ |
| $W_{+IR}$ | $W_{+IR}$ | $W_{+IR}$ | $W_{+IR}$ |
| $W_{+IR}$ | $W_{+IR}$ | $W_{+IR}$ | $W_{+IR}$ |

FIG. 10c

| $R_{+IR}$ | $R_{+IR}$ | $R_{+IR}$ | $R_{+IR}$ |
| --- | --- | --- | --- |
| $R_{+IR}$ | $R_{+IR}$ | $R_{+IR}$ | $R_{+IR}$ |
| $R_{+IR}$ | $R_{+IR}$ | $R_{+IR}$ | $R_{+IR}$ |
| $R_{+IR}$ | $R_{+IR}$ | $R_{+IR}$ | $R_{+IR}$ |

FIG. 10d

| $G_{+IR}$ | $G_{+IR}$ | $G_{+IR}$ | $G_{+IR}$ |
| --- | --- | --- | --- |
| $G_{+IR}$ | $G_{+IR}$ | $G_{+IR}$ | $G_{+IR}$ |
| $G_{+IR}$ | $G_{+IR}$ | $G_{+IR}$ | $G_{+IR}$ |
| $G_{+IR}$ | $G_{+IR}$ | $G_{+IR}$ | $G_{+IR}$ |

FIG. 10e

| $B_{+IR}$ | $B_{+IR}$ | $B_{+IR}$ | $B_{+IR}$ |
| --- | --- | --- | --- |
| $B_{+IR}$ | $B_{+IR}$ | $B_{+IR}$ | $B_{+IR}$ |
| $B_{+IR}$ | $B_{+IR}$ | $B_{+IR}$ | $B_{+IR}$ |
| $B_{+IR}$ | $B_{+IR}$ | $B_{+IR}$ | $B_{+IR}$ |

FIG. 15

| CLASSIFICATION | SPECIFIC EXAMPLE |
|---|---|
| 1 COMPLEMENTARY COLOR + 2 PRIMARY COLORS + WHITE | Ye, R, G, W |
| | Cy, B, G, W |
| | Mg, B, R, W |
| 2 COMPLEMENTARY COLORS + 1 PRIMARY COLOR + WHITE | Ye, Cy, R, W |
| | Ye, Cy, B, W |
| | Ye, Mg, G, W |
| | Ye, Mg, B, W |
| | Cy, Mg, R, W |
| | Cy, Mg, G, W |
| 3 COMPLEMENTARY COLORS + WHITE | Ye, Cy, Mg, W |
| 1 COMPLEMENTARY COLOR + 3 PRIMARY COLORS | Ye, R, G, B |
| | Cy, R, G, B |
| | Mg, R, G, B |
| 2 COMPLEMENTARY COLORS + 2 PRIMARY COLORS | Ye, Cy, G, R |
| | Ye, Cy, G, B |
| | ⋮ |
| COMPLEMENTARY COLORS | Ye, Cy, Mg, G |

FIG. 20

$$\begin{pmatrix} r_1,\ldots,r_n \\ g_1,\ldots,g_n \\ b_1,\ldots,b_n \\ ir_1,\ldots,ir_n \end{pmatrix} = H \begin{pmatrix} R'_1,\ldots,R'_n \\ G'_1,\ldots,G'_n \\ B'_1,\ldots,B'_n \\ IR'_1,\ldots,IR'_n \\ R'^2_1,\ldots,R'^2_n \\ G'^2_1,\ldots,G'^2_n \\ B'^2_1,\ldots,B'^2_n \\ IR'^2_1,\ldots,IR'^2_n \\ R'G'_1,\ldots,R'G'_n \\ R'B'_1,\ldots,R'B'_n \\ R'IR'_1,\ldots,R'IR'_n \\ G'B'_1,\ldots,G'B'_n \\ G'IR'_1,\ldots,G'IR'_n \\ B'IR'_1,\ldots,G'IR'_n \end{pmatrix}$$

$$= \begin{pmatrix} H_{11} & H_{12} & H_{13} & H_{14} & H_{15} & H_{16} & H_{17} & H_{18} & H_{19} & H_{1A} & H_{1B} & H_{1C} & H_{1D} & H_{1E} \\ H_{21} & H_{22} & H_{23} & H_{24} & H_{25} & H_{26} & H_{27} & H_{28} & H_{29} & H_{2A} & H_{2B} & H_{2C} & H_{2D} & H_{2E} \\ H_{31} & H_{32} & H_{33} & H_{34} & H_{35} & H_{36} & H_{37} & H_{38} & H_{39} & H_{3A} & H_{3B} & H_{3C} & H_{3D} & H_{3E} \\ H_{41} & H_{42} & H_{43} & H_{44} & H_{45} & H_{46} & H_{47} & H_{48} & H_{49} & H_{4A} & H_{4B} & H_{4C} & H_{4D} & H_{4E} \end{pmatrix} \begin{pmatrix} R'_1,\ldots,R'_n \\ G'_1,\ldots,G'_n \\ B'_1,\ldots,B'_n \\ IR'_1,\ldots,IR'_n \\ R'^2_1,\ldots,R'^2_n \\ G'^2_1,\ldots,G'^2_n \\ B'^2_1,\ldots,B'^2_n \\ IR'^2_1,\ldots,IR'^2_n \\ R'G'_1,\ldots,R'G'_n \\ R'B'_1,\ldots,R'B'_n \\ R'IR'_1,\ldots,R'IR'_n \\ G'B'_1,\ldots,G'B'_n \\ G'IR'_1,\ldots,G'IR'_n \\ B'IR'_1,\ldots,G'IR'_n \end{pmatrix}$$

FIG. 21

$$\begin{pmatrix} r \\ g \\ b \\ ir \end{pmatrix} = H \begin{pmatrix} R' \\ G' \\ B' \\ IR' \\ R'^2 \\ G'^2 \\ B'^2 \\ IR'^2 \\ R'G' \\ R'B' \\ R'IR' \\ G'B' \\ G'IR' \\ B'IR' \end{pmatrix}$$

$$= \begin{pmatrix} H_{11} & H_{12} & H_{13} & H_{14} & H_{15} & H_{16} & H_{17} & H_{18} & H_{19} & H_{1A} & H_{1B} & H_{1C} & H_{1D} & H_{1E} \\ H_{21} & H_{22} & H_{23} & H_{24} & H_{25} & H_{26} & H_{27} & H_{28} & H_{29} & H_{2A} & H_{2B} & H_{2C} & H_{2D} & H_{2E} \\ H_{31} & H_{32} & H_{33} & H_{34} & H_{35} & H_{36} & H_{37} & H_{38} & H_{39} & H_{3A} & H_{3B} & H_{3C} & H_{3D} & H_{3E} \\ H_{41} & H_{42} & H_{43} & H_{44} & H_{45} & H_{46} & H_{47} & H_{48} & H_{49} & H_{4A} & H_{4B} & H_{4C} & H_{4D} & H_{4E} \end{pmatrix} \begin{pmatrix} R' \\ G' \\ B' \\ IR' \\ R'^2 \\ G'^2 \\ B'^2 \\ IR'^2 \\ R'G' \\ R'B' \\ R'IR' \\ G'B' \\ G'IR' \\ B'IR' \end{pmatrix}$$

FIG. 29

$$\begin{pmatrix} r \\ g \\ b \\ ir \end{pmatrix} = \begin{pmatrix} H_{11}, \ldots, H_{11F} \\ H_{21}, \ldots, H_{21F} \\ H_{31}, \ldots, H_{31F} \\ H_{41}, \ldots, H_{41F} \end{pmatrix} \begin{pmatrix} R' \\ G' \\ B' \\ IR' \\ R'^2 \\ G'^2 \\ B'^2 \\ IR'^2 \\ R'G' \\ R'B' \\ R'IR' \\ G'B' \\ G'IR' \\ B'IR' \\ R'G'B' \\ R'^2 B' \\ R'^2 G' \\ R'^2 IR' \\ G'^2 R' \\ G'^2 B' \\ G'^2 IR' \\ B'^2 R' \\ B'^2 G' \\ B'^2 IR \\ IR'^2 R' \\ IR'^2 G' \\ IR'^2 B' \end{pmatrix}$$

IMAGE PROCESSING DEVICE, IMAGING DEVICE, INFORMATION PROCESSING DEVICE, AND IMAGE PROCESSING METHOD

CROSS REFERENCE TO RELATED APPLICATIONS

This application is a U.S. National Phase of International Patent Application No. PCT/JP2015/060457 filed on Apr. 2, 2015, which claims priority benefit of Japanese Patent Application No. JP 2014-134026 filed in the Japan Patent Office on Jun. 30, 2014. Each of the above-referenced applications is hereby incorporated herein by reference in its entirety.

TECHNICAL FIELD

The present technology relates to an image processing device, an imaging device, an information processing device, an image processing method, and a program under which a computer executes this method. More specifically, the present technology relates to an image processing device, an imaging device, an information processing device, an image processing method, and a program under which a computer executes this method, as devices, method, and program for separating an invisible light component.

BACKGROUND ART

Conventional imaging devices such as monitoring cameras often have a function of increasing luminance of images by using infrared light when a degree of measured surrounding brightness is low, and a function of removing infrared light components from images when the degree of brightness is high. These functions are generally called a day and night function.

For example, there has been proposed an imaging device which separates and removes an infrared light component contained in each of a plurality of pixel signals by performing weighted summation of the pixel signals in image processing when surrounding brightness is sufficient (for example, see Patent Document 1). This imaging device performs the image processing on the assumption that the sum of respective sensitivities of red, green, and blue pixels to visible light is equalized with a sensitivity of a while pixel to visible light. For example, performed is image processing which calculates a difference between a value obtained by weighted summation of pixel signals of red, green, and blue pixels by an identical coefficient of 0.5, and a value obtained by weighting a pixel signal of a white pixel by a coefficient of 0.5. When the foregoing assumption holds, an invisible light component (such as infrared light component) is calculated by the image processing with cancelation of visible light components. The imaging device removes the calculated invisible light components from the pixel signals to calculate the visible light components.

CITATION LIST

Patent Document

Patent Document 1: Japanese Patent Application Laid-Open No. 2008-289000

SUMMARY OF THE INVENTION

Problems to be Solved by the Invention

However, calculation of an invisible light component with sufficient accuracy may become difficult when the conventional technology described above is used. More specifically, a sum of respective sensitivities of red, green, and blue pixels to visible light in an actual product is not exactly equalized with a sensitivity of white pixel to visible light in many cases, in which condition the foregoing assumption does not hold. Accordingly, color reproducibility of visible light lowers, wherefore image quality deteriorates.

The present technology has been developed in consideration of the aforementioned circumstances. An object of the present technology is to improve image quality.

Solutions to Problems

The present technology has been developed to solve the aforementioned problems. A first aspect is directed to an image processing device, an image processing method, and a program under which a computer executes the method, each of the device, method, and program including: an adding unit that generates a summed value corresponding to a sum of all values of respective pixel signals of a plurality of first pixels each of which has sensitivities to visible light and invisible light, wherein the values are weighted by first weighting coefficients that are different from each other and determined such that a difference between a sum of the sensitivities of the first pixels to the visible light and a sensitivity of a second pixel to the visible light, which second pixel has sensitivities to the visible light and the invisible light, becomes smaller than a predetermined tolerance in a state that the sensitivities of the first pixels to the visible light are weighted by the first weighting coefficients and that the sensitivity of the second pixel to the visible light is weighted by a second weighting coefficient; a weighting processing unit that weights a pixel signal of the second pixel by the second weighting coefficient; and an invisible light component generation unit that generates, as a component of the invisible light within each of the pixel signals, a difference between the weighted pixel signal of the second pixel and the summed value. This configuration produces an effect of producing, as the component of the invisible light, the difference between the summed value corresponding to the weighted sum of all the pixel signals of the plurality of first pixels by the first weighting coefficients different from each other, and the pixel signal of the second pixel weighted by the second weighting coefficient.

There may be further provided in the first aspect a visible light component generation unit that generates a component of the visible light contained in each of the pixel signals of the plurality of first pixels on the basis of the pixel signal of the corresponding first pixel. This configuration produces an effect of producing the component of the visible light.

In addition, the visible light component generation unit of the first aspect may generate, as a component of the visible light contained in the pixel signal of a target pixel corresponding to any one of the plurality of first pixels, a signal obtained by weighted summation of the respective pixel signals of the plurality of first pixels and the second pixel by using third weighting coefficients that are different from each other and determined such that a difference between a sum of respective sensitivities of the plurality of first pixels and the second pixel to light containing the visible light and the invisible light and the sensitivity of the target pixel to the visible light becomes smaller than a predetermined set value in a state that the respective sensitivities of the first pixels and the second pixel to the light containing the visible light and the invisible light are weighted by the third weighting coefficients. This configuration produces an effect of generating, as the component of the visible light, the signal obtained by weighted summation of the pixel signals of the plurality of first pixels and the second pixel by the third weighting coefficients.

In addition, the visible light component generation unit of the first aspect may generate, as a component of the visible light, a difference between the pixel signal of a target pixel corresponding to any one of the plurality of first pixels and the component of the invisible light in a state that the component of the invisible light is weighted by a fourth weighting coefficient that increases as the sensitivity of the target pixel to the invisible light increases. This configuration produces an effect of generating, as the component of the visible light, the difference between the pixel signal of the target pixel and the component of the invisible light weighted by the fourth weighting coefficient.

There may be further provided in the first aspect a correction unit that corrects the components of the visible light and the invisible light by a process for generating a high dimension component having a dimension higher than dimensions of the components of both the visible light and the visible light, and performing weighted summation of the high dimension component, the component of the invisible light, and the component of the visible light. This configuration produces an effect of correcting the components of the visible light and the invisible light.

In addition, the correction unit of the first aspect may generate, as the high dimension component, at least either a squared value of the component of the invisible light or a squared value of the component of the visible light. This configuration produces an effect of generating, as the high dimension component, at least either the squared value of the component of the invisible light or the squared value of the component of the visible light.

In addition, the visible light component of the first aspect may contain a plurality of color components. The correction unit may generate, as the high dimension component, a component obtained by multiplying one of a pair of components included in the component of the invisible light and the plurality of color components by the other component of the pair. This configuration produces an effect of generating, as the high dimension component, the component obtained by multiplying one of a pair of components included in the component of the invisible light and the plurality of color components by the other component of the pair.

In addition, the correction unit of the first aspect may generate, as the high dimension component, at least either a value obtained by multiplying a squared value of the component of the invisible light by the component of the visible light, or a value obtained by multiplying a squared value of the component of the visible light by the component of the invisible light. This configuration produces an effect of generating, as the high dimension component, at least either the value obtained by multiplying a squared value of the component of the invisible light by the component of the visible light, or a value obtained by multiplying a squared value of the component of the visible light by the component of the invisible light.

There may be further provided in the first aspect a detection unit that detects whether or not the pixel signal of the second pixel is larger than a predetermined threshold, and performs weighted summation of the pixel signal of the second pixel and the component of the invisible light component when the pixel signal of the second pixel is larger than the predetermined threshold. This configuration produces an effect of performing weighted summation of the pixel signal of the second pixel and the component of the invisible light component when the pixel signal of the second pixel is larger than the predetermined threshold.

In addition, in the first aspect, a difference between the pixel signal of the second pixel and a weighted value of the component of the invisible light may be generated as a luminance signal. This configuration produces an effect of generating, as the luminance signal, the difference between the pixel signal of the second pixel and the weighted value of the component of the invisible light.

In addition, the plurality of first pixels of the first aspect may contain a pixel that has a highest sensitivity to red light in the visible light, a pixel that has a highest sensitivity to green light in the visible light, and a pixel that has a highest sensitivity to blue light in the visible light. The second pixel may be a pixel that has a highest sensitivity to white light in the visible light. This configuration produces an effect of generating, as the component of the invisible light, a difference between a value obtained by weight summation of the pixel that has a highest sensitivity to red light, a pixel that has a highest sensitivity to green light, and the pixel that has a highest sensitivity to blue light, and a weighted value of the pixel having a highest sensitivity to white light.

In addition, a second aspect of the present technology is directed to an imaging device including: an imaging unit that forms image data containing respective pixel signals of a plurality of first pixels having sensitivities to visible light and invisible light, and a pixel signal of a second pixel having sensitivity to the visible light and the invisible light; an adding unit that generates a summed value corresponding to a sum of all values of the respective pixel signals of the plurality of first pixels, wherein the values are weighted by first weighting coefficients that are different from each other and determined such that a difference between a sum of the sensitivities of the first pixels to the visible light and the sensitivity of the second pixel to the visible light becomes smaller than a predetermined tolerance in a state that the sensitivities of the first pixels to the visible light are weighted by the first weighting coefficients and that the sensitivity of the second pixel to the visible light is weighted by a second weighting coefficient; a weighting processing unit that weights the pixel signal of the second pixel by the second weighting coefficient; and an invisible light component generation unit that generates, as a component of the invisible light within each of the pixel signals, a difference between the weighted pixel signal of the second pixel and the summed value. This configuration produces an effect of producing, as the component of the invisible light, the difference between the summed value corresponding to the weighted sum of all the pixel signals of the plurality of first pixels by the first weighting coefficients different from each other, and the pixel signal of the second pixel weighted by the second weighting coefficient.

In addition, a third aspect of the present technology is directed to an information processing device including: a difference acquisition unit that obtains, for a plurality of first pixels having sensitivities to visible light and invisible light and a second pixel having sensitivities to the visible light and the invisible light, a difference between a sum of the sensitivities of the first pixels to the visible light and the sensitivity of the second pixel to the visible light in a state that the sensitivities of the first pixels to the visible light are weighted by first weighting coefficients different from each other, and that the sensitivity of the second pixel is weighted by a second weighting coefficient; and a coefficient acquisition unit that obtains the first and second weighting coefficients that produce the difference smaller than a predetermined tolerance. This configuration produces an effect of obtaining the difference between the sum of the sensitivities of the plurality of first pixels to the visible light and the sensitivity of the second pixel to the visible light in a state that the sensitivities of the first pixels to the visible light are weighted by the first weighting coefficients different from each other, and that the sensitivity of the second pixel is weighted by the second weighting coefficient, and obtaining the first and second weighting coefficients that produce the difference smaller than a predetermined tolerance.

Effects of the Invention

According to the present technology, an excellent effect of image quality improvement is produced. Note that advantages to be offered are not limited to these advantages, but may be any of advantages described in the present disclosure.

BRIEF DESCRIPTION OF DRAWINGS

FIG. 6a and FIG. 6b are view showing an example of calculation formulae used by the infrared light separation unit according to the first embodiment.

FIGS. 10a, 10b, 10c, 10d and 10e area view illustrating an example of image data according to the first embodiment.

FIG. 15 is a view illustrating an example of pixel arrangements according to a modified example of the first embodiment.

FIG. 20 is a view showing an example of an operation formula for obtaining coefficients according to the third embodiment.

FIG. 21 is a view showing an example of a calculation formula used by an infrared light separation unit according to the third embodiment.

FIG. 29 is a view showing an example of a calculation formula used by an infrared light separation unit according to a modified example of the third embodiment.

MODES FOR CARRYING OUT THE INVENTION

Modes for carrying out the present technology (hereinafter referred to as embodiments) are described hereinbelow. The description is presented in the following order.

1. First Embodiment (example of weighted summation of pixel signals)

2. Second Embodiment (example of weighted summation of pixel signals for obtaining infrared light components, and removal of infrared light components from pixel signals)

3. Third Embodiment (example of weighted summation of pixel signals for correction)

4. Fourth Embodiment (example of calculation of coefficients used for weighted summation)

<1. First Embodiment>

[Configuration Example of Imaging Device]

Figure 1:
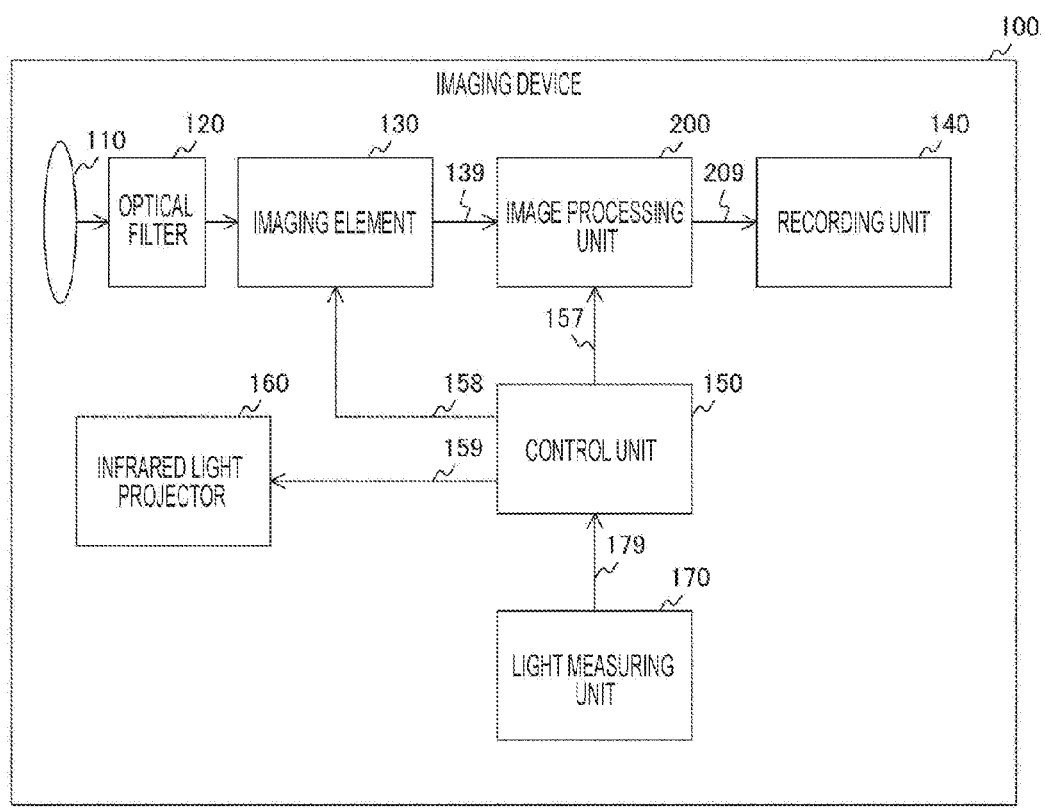
FIG. 1 is a block diagram illustrating a configuration example of an imaging device according to a first embodiment.

FIG. 1 is a block diagram illustrating a configuration example of an imaging device 100 according to an embodiment of the present technology. The imaging device 100 is a device which forms an image, and includes an imaging lens 110, an optical filter 120, an imaging element 130, an image processing unit 200, a recording unit 140, a control unit 150, an infrared light projector 160, and a light measuring unit 170.

The imaging lens 110 is a lens which collects light from a subject, and guides the collected light to the imaging element 130 via the optical filter 120. The optical filter 120 transmits visible light and infrared light contained in light received from the imaging lens 110.

The imaging element 130 converts light received via the optical filter 120 into electric signals to generate image data. The imaging element 130 includes red (R) pixels, green (G) pixels, blue (B) pixels, and white (W) pixels arranged in a two-dimensional cross-grating shape, for example. The imaging element 130 performs analog-to-digital (AD) conversion for an analog electric signal obtained by photoelectric conversion at each pixel to generate a digital signal constituting a pixel signal for each pixel, and outputs data containing pixel signals thus generated as image data. The imaging element 130 is constituted by a charge coupled device (CCD) sensor, or a complementary metal oxide semiconductor (CMOS) sensor, for example. The imaging element 130 supplies generated image data to the image processing unit 200 via a signal line 139. Note that the imaging element 130 is an example of an imaging unit according to the appended claims.

The infrared light projector 160 applies infrared light to a subject under control of the control unit 150.

The light measuring unit 170 measures a degree of brightness around the imaging device 100. The light measuring unit 170 supplies a measured light amount to the control unit 150 via a signal line 179.

The control unit 150 controls the whole of the imaging device 100. The control unit 150 allows the imaging element 130 to generate image data in accordance with an operation by a user or the like. The control unit 150 further acquires a light amount measured by the light measuring unit 170. When a measured light amount is a threshold Th1 or larger, the control unit 150 turns off light of the infrared light projector 160. On the other hand, when a measured light amount is smaller than the threshold Th1, the control unit 150 turns on the infrared light projector 160 during imaging. The control unit 150 further supplies a coefficient Kw corresponding to a measured light amount to the image processing unit 200.

The image processing unit 200 performs predetermined image processing for image data. For example, the image processing unit 200 performs various types of image processing including a white balance process and gamma correction. The image processing will be detailed below. After image processing, the image processing unit 200 supplies image data to the recording unit 140 via a signal line 209. The recording unit 140 records image data received from the image processing unit 200.

Note that the imaging device 100 may further include a display unit and display image data on the display unit. In addition, the imaging device 100 may further include an interface, and output image data to an external device via the interface.

Furthermore, while the imaging element 130, the image processing unit 200, the recording unit 140, the control unit 150, the infrared light projector 160, and the light measuring unit 170 are provided within the same device in this embodiment, these units may be provided in separate devices. For example, the imaging element 130 and others may be included in the imaging device 100, while the image processing unit 200 may be included in an information processing device or the like. Note that the imaging device 100 is an example of an image processing device according to the appended claims.

Furthermore, while the imaging device 100 includes the infrared light projector 160 which is turned on in a dark condition, the infrared light projector 160 may be eliminated. It is preferable, however, that the infrared light projector 160 is provided and turned on in a dark condition from a viewpoint of improvement of luminance of images.

Figure 2:
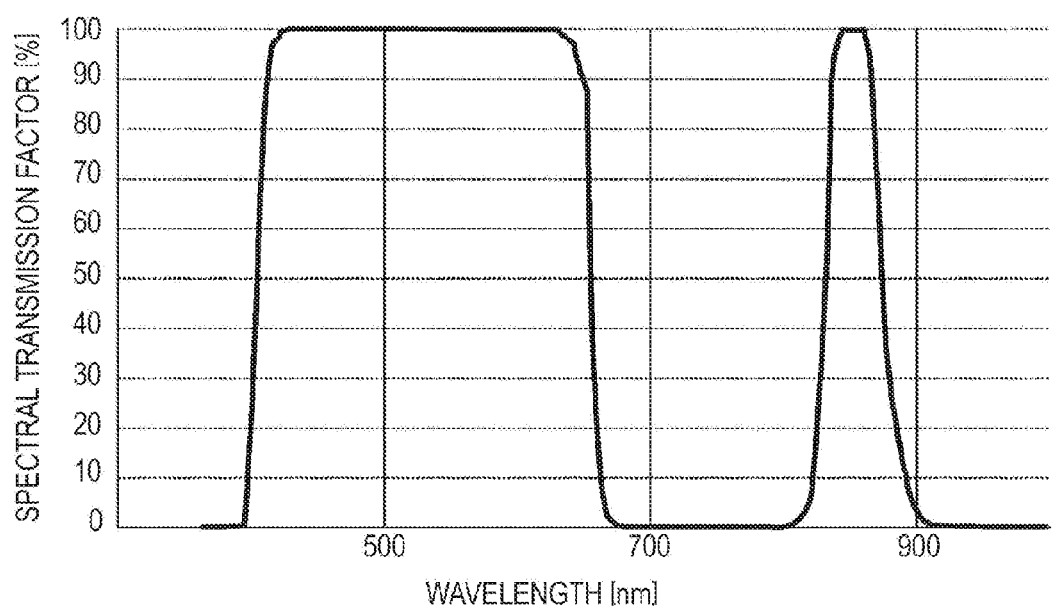
FIG. 2 is a graph showing an example of transmission characteristics of an optical filter according to the first embodiment.

FIG. 2 is a graph showing an example of transmission characteristics of the optical filter 120 according to the first embodiment. In this figure, a vertical axis represents a spectral transmission factor of the optical filter 120, while a horizontal axis represents a wavelength of light. As illustrated in the example of the figure, the optical filter 120 transmits visible light in a wavelength range from 380 nanometer (nm) to 650 nm, and infrared light having a wavelength longer than this range.

Figure 3:
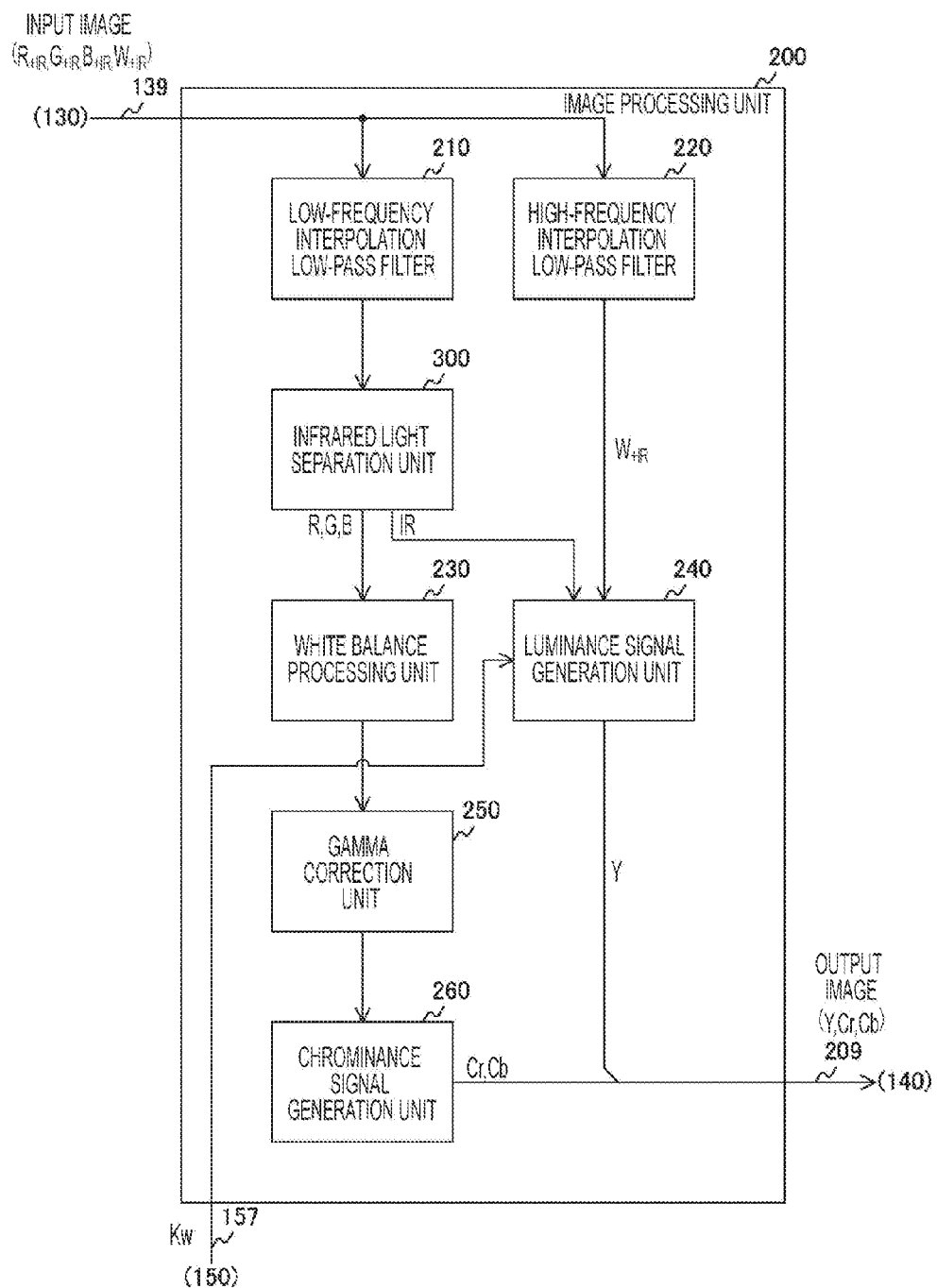
FIG. 3 is a block diagram illustrating a configuration example of an image processing unit according to the first embodiment.

FIG. 3 is a block diagram illustrating a configuration example of the image processing unit 200 according to the first embodiment. The image processing unit 200 includes a low-frequency interpolation low-pass filter 210, a high-frequency interpolation low-pass filter 220, an infrared light separation unit 300, a white balance processing unit 230, a luminance signal generation unit 240, a gamma correction unit 250, and a chrominance signal generation unit 260.

The low-frequency interpolation low-pass filter 210 interpolates a lack of color information in each of pixel signals of the R pixel, G pixel, B pixel, and W pixel. In this case, each of the R pixel, G pixel, B pixel, and W pixel receives infrared light together with visible light, and generates a pixel signal from the received light. Accordingly, each of the pixel signals of these pixels contains a visible light component corresponding to a signal obtained by photoelectric conversion from visible light, and an infrared light component corresponding to a signal obtained by photoelectric conversion from infrared light. Respective pixel signals of the R pixel, G pixel, B pixel, and W pixel before separation of the infrared light components are therefore hereinafter referred to as "$R_{+IR}$", "$G_{+IR}$", "$B_{+IR}$", and "$W_{+IR}$", respectively. A subscript "+IR" given to each pixel signal indicates that the corresponding pixel signal contains an infrared light component. The low-frequency interpolation low-pass filter 210 generates data containing the pixel signal $R_{+IR}$, $G_{+IR}$, $B_{+IR}$, or $W_{+IR}$ for each pixel by interpolation, and supplies the generated data to the infrared light separation unit 300.

The high-frequency interpolation low-pass filter 220 interpolates the pixel signal $W_{+IR}$ in each of the R pixel, G pixel, and B pixel. The high-frequency interpolation low-pass filter 220 generates data containing the pixel signal $W_{+IR}$ for each pixel by interpolation, and supplies the generated data to the luminance signal generation unit 240.

The infrared light separation unit 300 separates a visible light component in a pixel signal from an infrared light component. The infrared light separation unit 300 performs a process for separating the pixel signals $R_{+IR}$, $G_{+IR}$, $B_{+IR}$, and $W_{+IR}$ into visible light components R, G, and B, and an infrared light component IR for each pixel. The infrared light separation unit 300 supplies the visible light components R, G, and B to the white balance processing unit 230, and supplies the infrared light component IR to the luminance signal generation unit 240.

The white balance processing unit 230 performs a white balance process for visible light components as necessary. For example, each level of R, G, and B is balanced by adjustment of a gain in accordance with a set color temperature. After the white balance process, the white balance processing unit 230 supplies visible light components to the gamma correction unit 250.

The gamma correction unit 250 performs gamma correction for visible light components as necessary, For example, each level of visible light components is corrected by adjustment of a gain in accordance with characteristics of display. After the gamma correction, the gamma correction unit 250 supplies visible light components to the chrominance signal generation unit 260.

The chrominance signal generation unit 260 generates chrominance signals Cb and Cr from the visible light components R, G, and B. The chrominance signals Cb and Cr are generated by using following formulae in conformity to standards of International Telecommunication Union Radiocommunication Sector (ITU-R). BT. 601, for example. The chrominance signal generation unit 260 supplies generated chrominance signals to the recording unit 140.

$$Cb = -0.168736 \times R - 0.331264 \times G + 0.5 \times B \quad \text{(Formula 1)}$$

$$Cr = 0.5 \times R - 0.418688 \times G - 0.081312 \times B \quad \text{(Formula 2)}$$

The luminance signal generation unit 240 generates a luminance signal Y from the pixel signal $W_{+IR}$ and the infrared light component IR. For example, the luminance signal generation unit 240 generates the luminance signal Y for each signal by using a following formula. The luminance signal generation unit 240 supplies a generated luminance signal to the recording unit 140.

$$Y = W_{+IR} IR \times Kw \quad \text{(Formula 3)}$$

In the above formula, Kw is a coefficient set in accordance with a measured light amount. When a measured light amount is the threshold Th1 or larger, for example, Kw is set to a set value D larger than "0" to Kw to remove the infrared light component IR from the pixel signal $W_{+IR}$. On the other hand, when a measured light amount is smaller than the threshold Th1, the set value D of Kw is determined such that the set value D becomes closer to "0" as the measured light amount decreases.

Note that the control unit 150 may control the set value D in accordance with a ratio of infrared light contained in ambient light to visible light. This control easily offers a preferable balance between a high ratio of signal to noise (S/N) and color reproducibility.

In addition, the image processing unit 200 which removes the infrared light component IR according to this embodiment may remove a component of invisible light other than infrared light (such as ultraviolet light), or may remove both the infrared light component and a component of invisible light other than infrared light. In this case, a filter transmitting invisible light corresponding to a separation target is provided as the optical filter 120.

Furthermore, while the imaging device 100 is configured to include the optical filter 120, the optical filter 120 may be eliminated. It is preferable, however, the optical filter 120 is provided from a viewpoint of improvement of color reproducibility.

Figure 4:
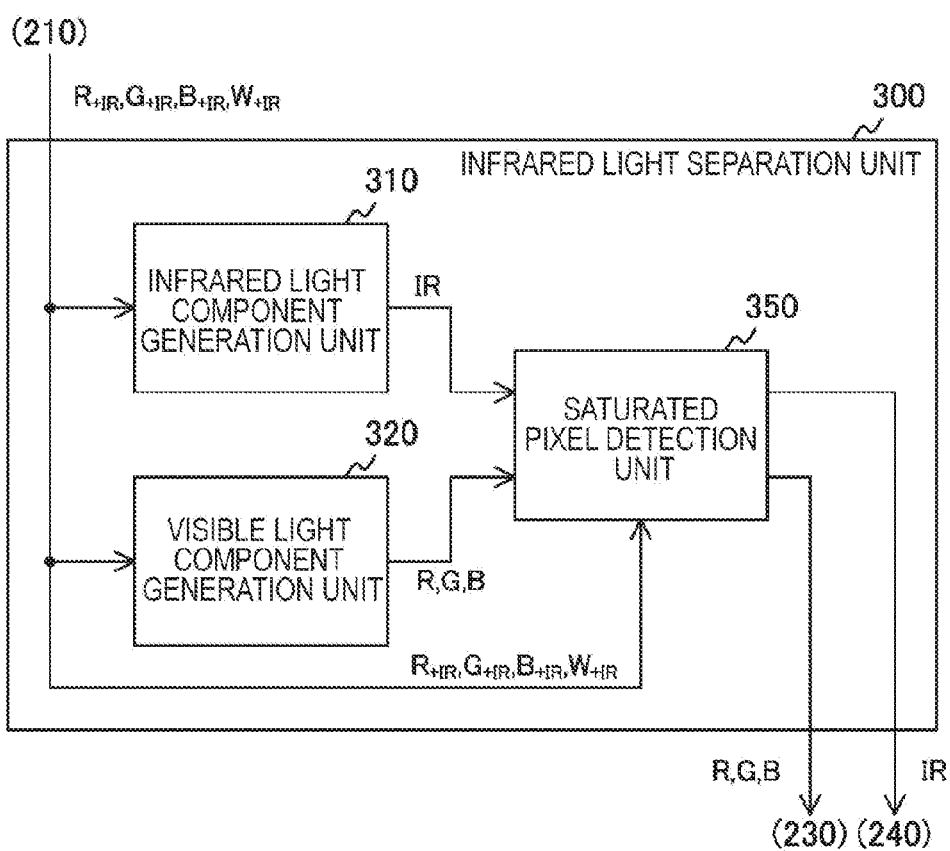
FIG. 4 is a block diagram illustrating a configuration example of an infrared light separation unit according to the first embodiment.

FIG. 4 is a block diagram illustrating a configuration example of the infrared light separation unit 300 according to the first embodiment. The infrared light separation unit 300 includes an infrared light component generation unit 310, a visible light component generation unit 320, and a saturated pixel detection unit 350.

The infrared light component generation unit 310 generates the infrared light component IR. The infrared light component generation unit 310 generates, as the infrared light component IR, a sum of the pixel signals $R_{+IR}$, $G_{+IR}$/$B_{+IR}$, and $W_{+IR}$ weighted by coefficients $K_{11}$, $K_{12}$, $K_{13}$, and $K_{14}$ different from each other. For example, the weighted sum is calculated by using a following formula.

$$IR = K_{41} \times R_{+IR} + K_{42} \times G_{+IR} + K_{43} \times B_{+IR} + K_{44} \times W_{+IR} \quad \text{(Formula 4)}$$

In this case, each of $K_{41}$, $K_{42}$, $K_{43}$, and $K_{44}$ is set to such a value that a sum of sensitivities of the R pixel, G pixel, B pixel, and W pixel to visible light in a state that the respective sensitivities are weighted by the corresponding coefficients becomes smaller than a tolerance. It is assumed, however, that the signs of $K_{41}$, $K_{42}$, and $K_{43}$ are the same sign, and that the sign of $K_{44}$ is different from the signs of $K_{41}$, $K_{42}$, and $K_{43}$. This tolerance is set to a value smaller than the sum of $K_{41}$, $K_{42}$, $K_{43}$, and $K_{44}$ set to 0.5, 0.5, 0.5, and −0.5, respectively. It is more preferable that these coefficients are set to such values that an error between a predetermined target sensitivity of a pixel to infrared light and a weighted sum of the respective sensitivities of the R pixel, G pixel, B pixel, and W pixel becomes a predetermined set value or smaller. This set value is a value smaller than an error produced when $K_{41}$, $K_{42}$, $K_{43}$, and $K_{44}$ are set to 0.5, 0.5, 0.5, and −0.5, respectively. In addition, it is more preferable that $K_{41}$, $K_{42}$, $K_{43}$, and $K_{44}$ are set to such values that the foregoing error becomes the minimum.

Note that each of the R, G, and B pixels is an example of first pixels according to the appended claims, and that the W pixel is an example of a second pixel according to the appended claims. In addition, each of the coefficients $K_{41}$, $K_{42}$, and $K_{43}$ is an example of first weighting coefficients according to the appended claims, while the coefficient $-K_{44}$ is an example of a second weighting coefficient according to the appended claims.

The visible light component generation unit 320 generates the visible light components R, G, and B. The visible light component generation unit 320 generates, as the visible light component R, a sum of the pixel signals $R_{+IR}$, $G_{+IR}$, $B_{+IR}$, and $W_{+IR}$ weighted by coefficients $K_{11}$, $K_{12}$, $K_{13}$, and $K_{14}$ different from each other. The visible light component generation unit 320 further generates, as the visible light component G, a sum of these pixel signals weighted by coefficients $K_{21}$, $K_{22}$, $K_{23}$, and $K_{24}$ different from each other. The visible light component generation unit 320 further generates, as the visible light component B, a sum of the respective pixel signals weighted by coefficients $K_{31}$, $K_{32}$, $K_{33}$, and $K_{34}$ different from each other. For example, the weighted sum is calculated by using a following formula.

$$R = K_{11} \times R_{+IR} + K_{12} \times G_{+IR} + K_{13} \times B_{+IR} + K_{14} \times W_{+IR} \quad \text{(Formula 5)}$$

$$G = K_{21} \times R_{+IR} + K_{22} \times G_{+IR} + K_{23} \times B_{+IR} + K_{24} \times W_{+IR} \quad \text{(Formula 6)}$$

$$B = K_{31} \times R_{+IR} + K_{32} \times G_{+IR} + K_{33} \times B_{+IR} + K_{34} \times W_{+IR} \quad \text{(Formula 7)}$$

In this case, each of $K_{11}$ through $K_{14}$ is set to such a value that an error between a target sensitivity of the R pixel to visible light and a sum of respective sensitivities of the R pixel, G pixel, B pixel, and W pixel weighted by the corresponding coefficients becomes a predetermined set value or smaller. This set value is a value smaller than an error produced when $K_{11}$, $K_{12}$, $K_{13}$, and $K_{14}$ are set to 0.5, −0.5, −0.5, and 0.5, respectively. It is more preferable that each of $K_{11}$ through $K_{14}$ is set to such a value that the error becomes the minimum.

Moreover, each of $K_{21}$ through $K_{24}$ is set to such a value that an error between a target sensitivity of the G pixel to visible light and a sum of respective sensitivities of the R pixel, G pixel, B pixel, and W pixel weighted by the corresponding coefficients becomes a predetermined set value or smaller. This set value is a value smaller than an error produced when $K_{21}$, $K_{22}$, $K_{23}$, and $K_{24}$ are set to −0.5, 0.5, −0.5, and 0.5, respectively. It is more preferable that each of $K_{21}$ through $K_{24}$ is set to such a value that the error becomes the minimum.

Moreover, each of $K_{31}$ through $K_{34}$ is set to such a value that an error between a target sensitivity of the B pixel to visible light and a sum of respective sensitivities of the R pixel, G pixel, B pixel, and W pixel weighted by the corresponding coefficients becomes a predetermined set value or smaller. This set value is a value smaller than an error produced when $K_{31}$, $K_{32}$, $K_{33}$, and $K_{34}$ are set to −0.5, −0.5, 0.5, and 0.5, respectively. It is more preferable that each of $K_{31}$ through $K_{34}$ is set to such a value that the error becomes the minimum.

Note that each of $K_{11}$ through $K_{14}$, $K_{21}$ through $K_{24}$, and $K_{31}$ through $K_{34}$ is an example of third weighting coefficients according to the appended claims.

The visible light component generation unit 320 supplies the generated visible light components R, G, and B to the saturated pixel detection unit 350.

The saturated pixel detection unit 350 detects a signal level of a pixel signal exceeding a predetermined threshold Th2, or not exceeding the threshold Th2. The saturated pixel detection unit 350 sets a coefficient α to such a value which decreases in a range from "0" to "1" as the signal level increases when the signal level exceeds the predetermined threshold Th2. The saturated pixel detection unit 350 sets the coefficient α to "1" when the signal level does not exceed Th2. Then, the saturated pixel detection unit 350 processes the infrared light component and the visible light components, and the pixel signals $R_{+IR}$, $G_{+IR}$, and $B_{+IR}$ by using following formulae.

$$R = \alpha \times R + (1-\alpha) \times R_{+IR} \quad \text{(Formula 8)}$$

$$G = \alpha \times G + (1-\alpha) \times G_{+IR} \quad \text{(Formula 9)}$$

$$B = \alpha \times B + (1-\alpha) \times B_{+IR} \quad \text{(Formula 10)}$$

$$IR = \alpha \times IR \quad \text{(Formula 11)}$$

This process achieves accurate calculation of the visible light components and the infrared light component even when a saturated pixel whose signal level exceeds the threshold Th2 is detected. The saturated pixel detection unit 350 supplies the processed visible light components to the white balance processing unit 230, and supplies the processed infrared light component to the luminance signal generation unit 240.

[Configuration Examples of Infrared Light Component Generation Unit and Visible Light Component Generation Unit]

Figure 5A:
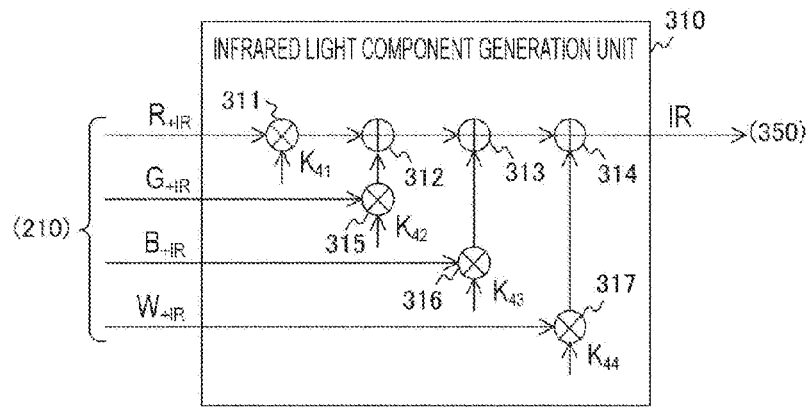
FIG. 5a and FIG. 5b are view illustrating configuration examples of an infrared light component generation unit and a visible light component generation unit according to the first embodiment.
Figure 5B:
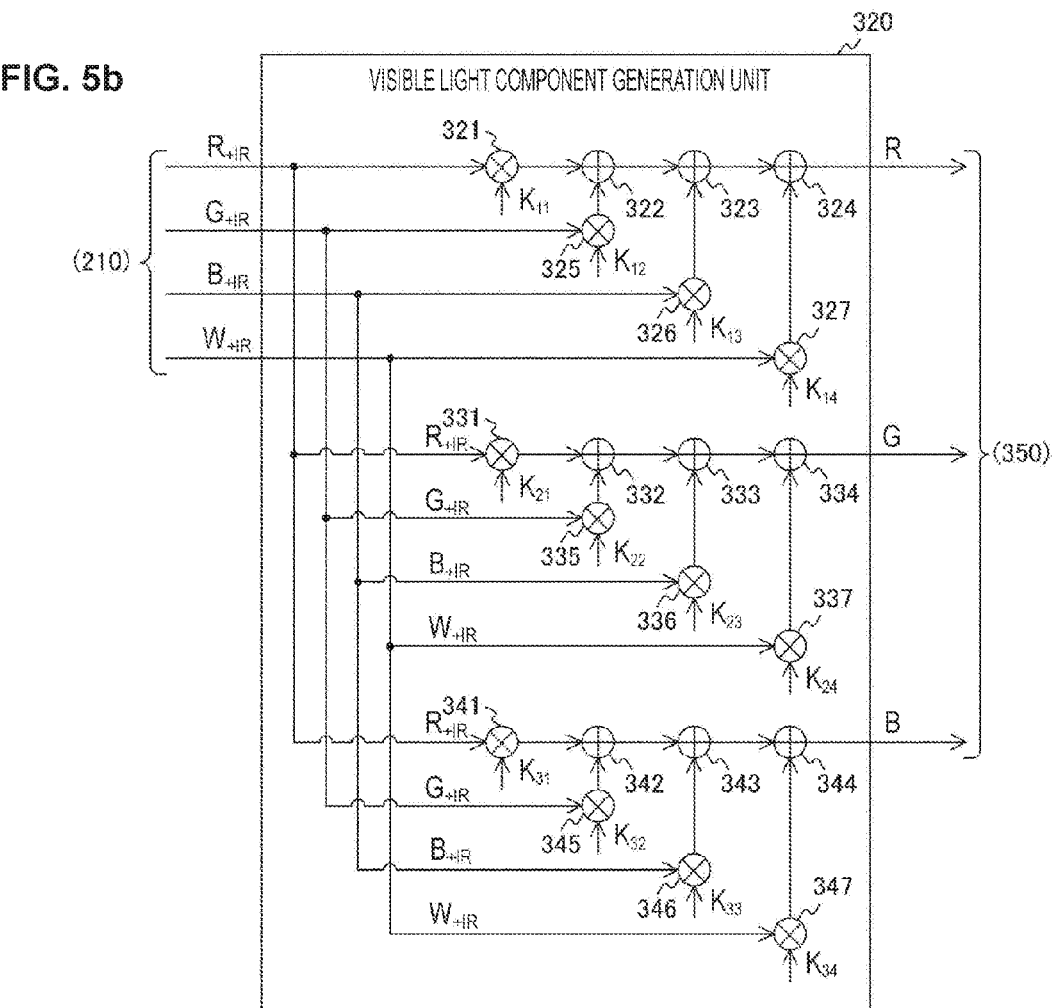

FIG. 5a and FIG. 5b are view illustrating configuration examples of the infrared light component generation unit 310 and the visible light component generation unit 320 according to the first embodiment. The infrared light component generation unit 310 includes multipliers 311, 315, 316, and 317, and adders 312, 313, and 314.

The multiplier 311 multiplies the pixel signal $R_{+IR}$ by the coefficient $K_{41}$, and supplies a result of multiplication to the adder 312. The multiplier 315 multiplies the pixel signal $G_{+IR}$ by the coefficient $K_{42}$, and supplies a result of multiplication to the adder 312. The multiplier 316 multiplies the pixel signal $B_{+IR}$ by the coefficient $K_{43}$, and supplies a result of multiplication to the adder 313. The multiplier 317 multiplies the pixel signal $W_{+IR}$ by the coefficient $K_{44}$, and supplies a result of multiplication to the adder 314.

The adder 312 sums the respective the results of multiplication received from the multipliers 311 and 315, and supplies a result of summation to the adder 313. The adder 313 sums the result of multiplication received from the multiplier 316 and the result of summation received from the adder 312, and supplies a result of summation to the adder 314. The adder 314 sums the result of multiplication received from the multiplier 317 and the result of summation received from the adder 313, and supplies a result of summation to the saturated pixel detection unit 350 as the infrared light component IR.

Note that a circuit constituted by the multipliers 311, 315, and 316, and the adders 312 and 313 is an example of an adding unit according to the appended claims. In addition, the multiplier 317 is an example of a weighting processing unit according to the appended claims, while the adder 314 is an example of an invisible light component generation unit.

The visible light component generation unit 320 includes multipliers 321, 325, 326, 327, 331, 335, 336, 337, 341, 345, 346, and 347, and adders 322, 323, 324, 332, 333, 334, 342, 343, and 344.

Each of the multipliers 321, 325, 326, and 327 multiplies $R_{+IR}$, $G_{+IR}$, $B_{+IR}$, and $W_{+IR}$, respectively, by the coefficients $K_{11}$, $K_{12}$, $K_{13}$, and $K_{14}$, respectively. Each of the adders 322, 323, and 324 sums corresponding results of multiplication received from the multipliers 321, 325, 326, and 327. A sum thus obtained is supplied to the saturated pixel detection unit 350 as the visible light component R.

Each of the multipliers 331, 335, 336, and 337 multiplies $R_{+IR}$, $G_{+IR}$, $B_{+IR}$, and $W_{+IR}$, respectively, by the coefficients $K_{21}$, $K_{22}$, $K_{23}$, and $K_{24}$, respectively. Each of the adders 332, 333, and 334 adds corresponding results of multiplication received from the multipliers 331, 335, 336, and 337. A sum thus obtained is supplied to the saturated pixel detection unit 350 as the visible light component G.

Each of the multipliers 341, 345, 346, and 347 multiplies $R_{+IR}$, $G_{+IR}$, $B_{+IR}$, and $W_{+IR}$, respectively, by the coefficients $K_{31}$, $K_{32}$, $K_{33}$, and $K_{34}$, respectively. Each of the adders 342, 343, and 344 adds corresponding results of multiplication received from the multipliers 341, 345, 346, and 347. A sum thus obtained is supplied to the saturated pixel detection unit 350 as the visible light component B.

FIG. 6a and FIG. 6b are view showing an example of calculation formulae used by the infrared light separation unit 300 according to the first embodiment. A part a in the figure shows a formula expressing the formulae 4 through 7 by using a matrix. Vectors constituted by the visible light components R, G, and B and the infrared light component IR are calculated by products of vectors constituted by the pixel signals $R_{+IR}$, $G_{+IR}$, $B_{+IR}$, and $W_{+IR}$ by a 4-row×4-column matrix.

A part b in FIG. 6a and FIG. 6b shows an example of coefficients set to $K_{11}$ through $K_{44}$ in the part a in this figure.

[Configuration Example of Saturated Pixel Detection Unit]

Figure 7:
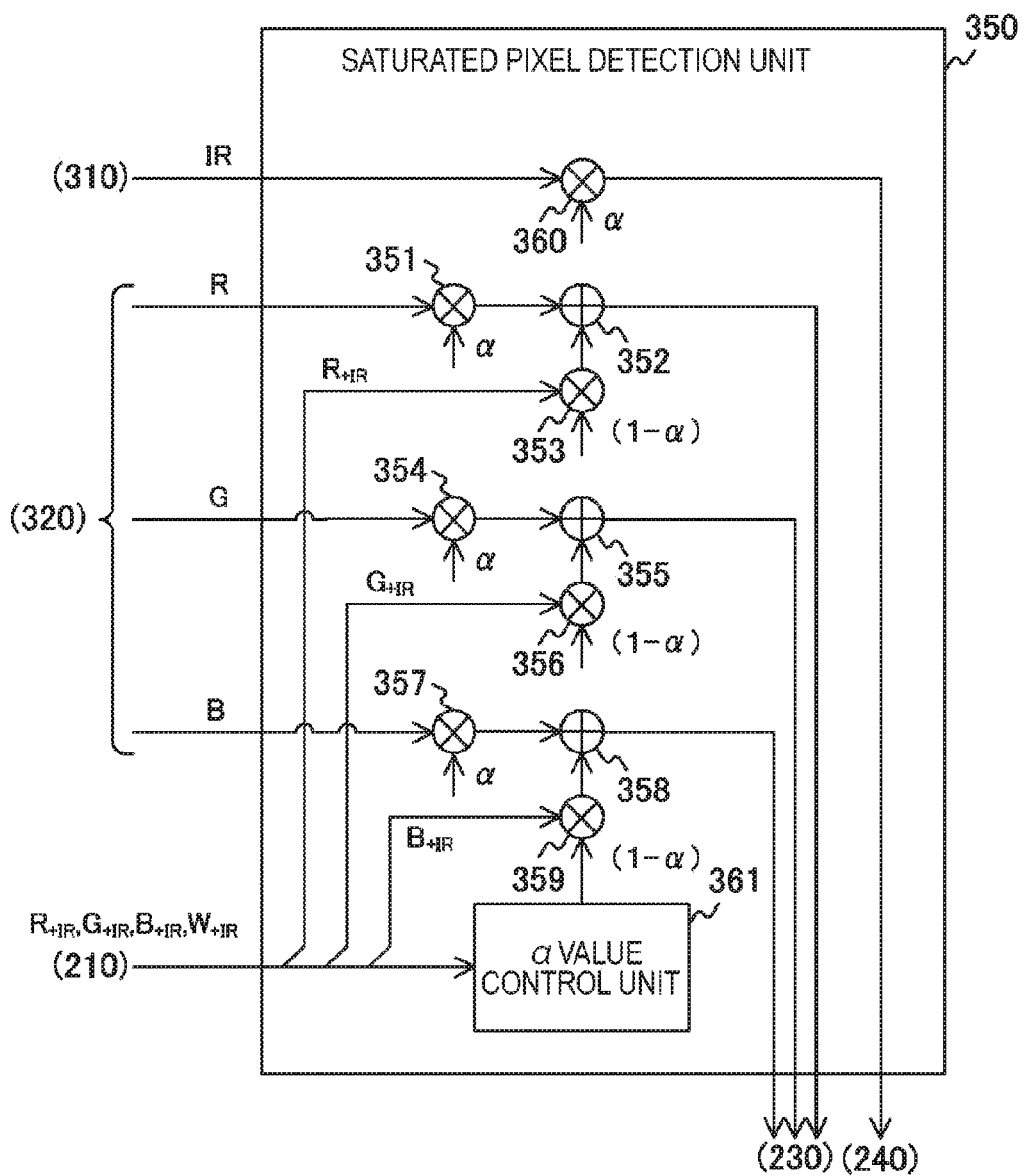
FIG. 7 is a view illustrating a configuration example of a saturated pixel detection unit according to the first embodiment.

FIG. 7 is a view illustrating a configuration example of the saturated pixel detection unit 350 according to the first embodiment. The saturated pixel detection unit 350 includes multipliers 351, 353, 354, 356, 357, 359, and 360, adders 352, 355, and 358, and an α value control unit 361.

The α value control unit 361 controls the coefficient α. The α value control unit 361 detects a signal level of a pixel signal exceeding the predetermined threshold Th2, or not exceeding the threshold Th2. Then, the α value control unit 361 sets the coefficient α to such a value which decreases as the level increases in a range of "0" or larger and smaller than "1" when the signal level exceeds the predetermined threshold Th2. The α value control unit 361 sets the coefficient α to "1" when the signal level does not exceed Th2. Then, the α value control unit 361 supplies the determined coefficient α to the multipliers 351, 354, 357, and 360, and supplies a coefficient (1−α) to the multipliers 353, 356, and 359.

The multiplier 351 multiplies the visible light component R by the coefficient α, and supplies a result of multiplication to the adder 352. The multiplier 353 multiplies the pixel signal $R_{+IR}$ by the coefficient (1−α), and supplies a result of multiplication to the adder 352. The adder 352 sums the respective results of multiplication received from the multipliers 351 and 353, and supplies a result of summation to the white balance processing unit 230 as the visible light component R.

The multiplier 354 multiplies the visible light component G by the coefficient α, and supplies a result of multiplication to the adder 355. The multiplier 356 multiplies the pixel signal $G_{+IR}$ by the coefficient (1−α), and supplies a result of multiplication to the adder 355. The adder 355 sums the respective results of multiplication received from the multipliers 354 and 356, and supplies a result of summation to the white balance processing unit 230 as the visible light component G.

The multiplier 357 multiplies the visible light component B by the coefficient α, and supplies a result of multiplication to the adder 358. The multiplier 359 multiplies the pixel signal $B_{+IR}$ by the coefficient (1−α), and supplies a result of multiplication to the adder 358. The adder 358 sums the respective results of multiplication received from the multipliers 357 and 359, and supplies a result of summation to the white balance processing unit 230 as the visible light component B.

The multiplier 360 multiplies the infrared light component IR by the coefficient α, and supplies a result of multiplication to the luminance signal generation unit 240.

Figure 8:
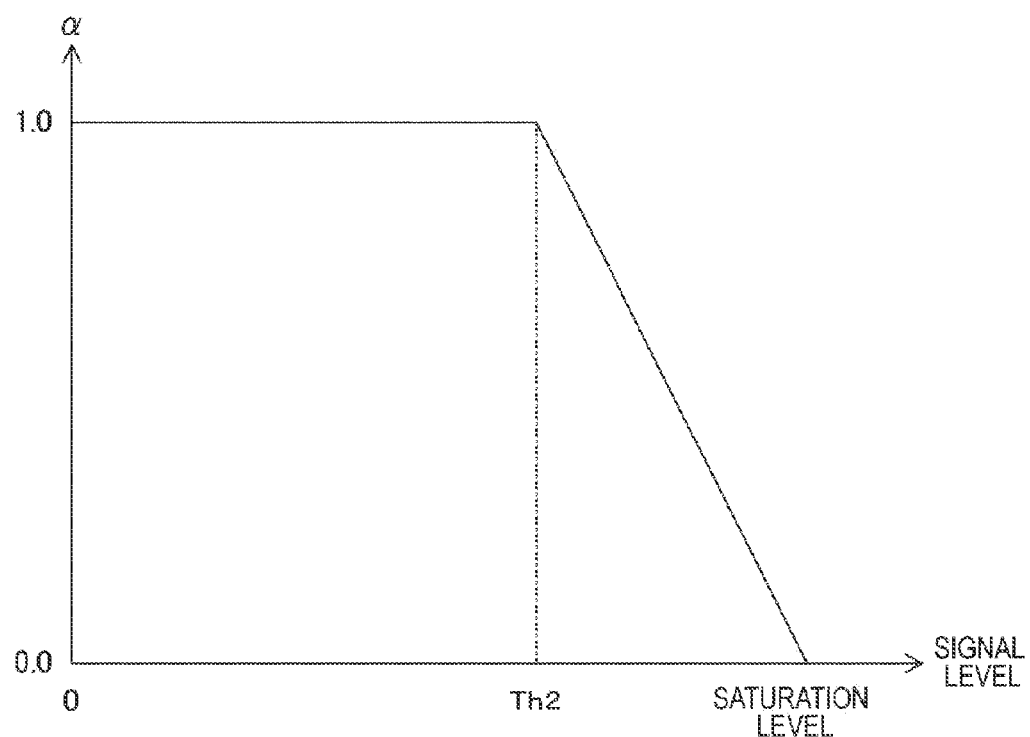
FIG. 8 is a graph showing a setting example of an α value for each signal level according to the first embodiment.

FIG. 8 is a graph showing a setting example of the value of the coefficient α for each signal level according to the first embodiment. A horizontal axis in the figure represents a signal level of a pixel signal coming from the low-frequency interpolation low-pass filter 210. A vertical axis represents the coefficient α. When the signal level is the threshold Th2 or lower, a value of "1" is set to the coefficient α, for example. When the signal level exceeds the threshold Th2, the coefficient α is set to such a value which decreases as the signal level increases.

[Configuration Example of Luminance Signal Generation Unit]

Figure 9A:
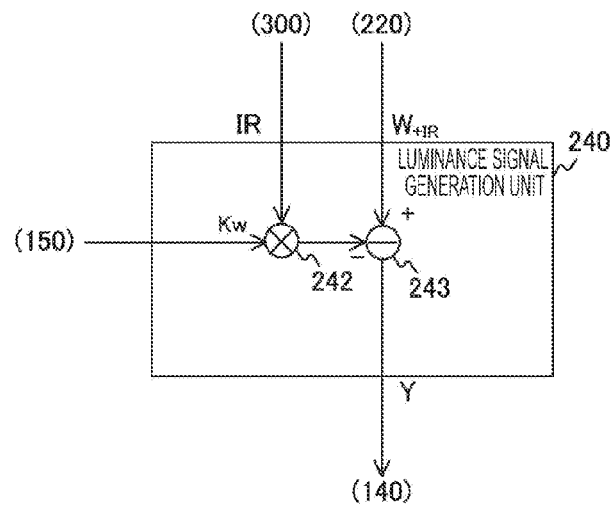
FIG. 9a and FIG. 9b are view illustrating a configuration example of a luminance signal generation unit according to the first embodiment.

A part in FIG. 9a is a view illustrating a configuration example of the luminance signal generation unit 240 according to the first embodiment. The luminance signal generation unit 240 includes a multiplier 242 and a subtracter 243.

The multiplier 242 multiplies the infrared light component IR by the coefficient Kw, and supplies a result of multiplication to the subtracter 243. The subtracter 243 subtracts the result of multiplication obtained by the multi-plier 242 from the pixel signal $W_{+IR}$, and supplies a result of subtraction to the recording unit 140 as a luminance signal Y.

Figure 9B:
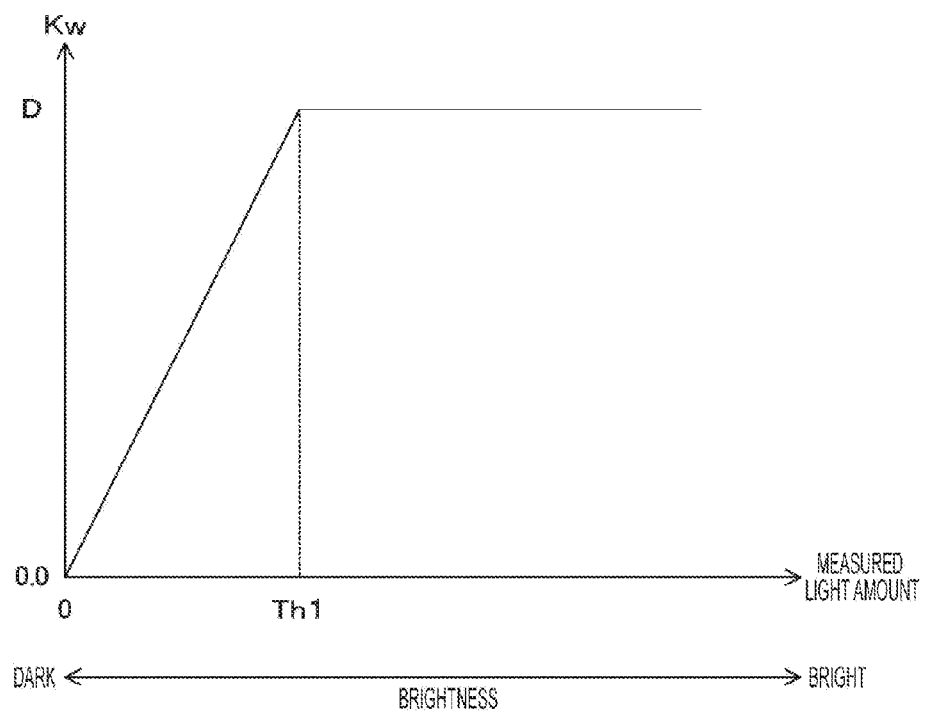

In this case, Kw is a coefficient for adjusting a gain in accordance with brightness (measured light amount). For example, as illustrated in a part in FIG. 9b, the coefficient Kw is set to the set value D when brightness is the threshold Th1 or higher. The coefficient Kw approaches zero as brightness decreases from Th1.

FIGS. 10a, 10b, 10c, 10d and 10e area view illustrating an example of image data according to the first embodiment. A part a in the figure shows a view illustrating an example of an input image 701 coming from the imaging element 130. The imaging element 130 includes the R pixels, G pixels, B pixels, and W pixels arranged in a predetermined pattern in a two-dimensional cross-grating shape. The input image 701 contains the pixel signals $R_{+IR}$, $G_{+IR}$, $B_{+IR}$, and $W_{+IR}$ received from these pixels.

A part in FIG. 10b is a view illustrating an example of data 702 generated after the input image 701 passes through the high-frequency interpolation low-pass filter 220. The high-frequency interpolation low-pass filter 220 interpolates $W_{+IR}$ in each pixel signal of the R pixel, G pixel, and B pixel, wherefore the data 702 contains the interpolated pixel signals $W_{+IR}$ instead of the pixel signals $R_{+IR}$, $G_{+IR}$, and $B_{+IR}$.

A part in FIG. 10c is a view illustrating an example of data 703 generated when the input image 701 passes through the low-frequency interpolation low-pass filter 210. The low-frequency interpolation low-pass filter 210 interpolates $R_{+IR}$ in each pixel signal of the G pixel, B pixel, and W pixel, wherefore the data 703 contains the interpolated pixel signals $R_{+IR}$ instead of the pixel signals $G_{+IR}$, $B_{+IR}$, and $W_{+IR}$.

Parts in FIGS. 10d and 10e are views illustrating examples of data 704 and 705, respectively, generated when the input image 701 passes through the low-frequency interpolation low-pass filter 210. The low-frequency interpolation low-pass filter 210 interpolates $G_{+IR}$ and $B_{+IR}$, wherefore the data 704 and 705 contain the interpolated pixel signals $G_{+IR}$ and $B_{+IR}$, respectively.

The pixel signals in the data 702 and 705 are separated into the visible light components R, G and B, and the infrared light component IR by matrix operation. Then, the chrominance signals Cr and Cb are generated from the visible light components R, G, and B for each pixel, while the luminance signal Y is generated from the infrared light component IR and the pixel signal $W_{+IR}$ for each pixel.

[Operation Example of Imaging Device]

Figure 11:
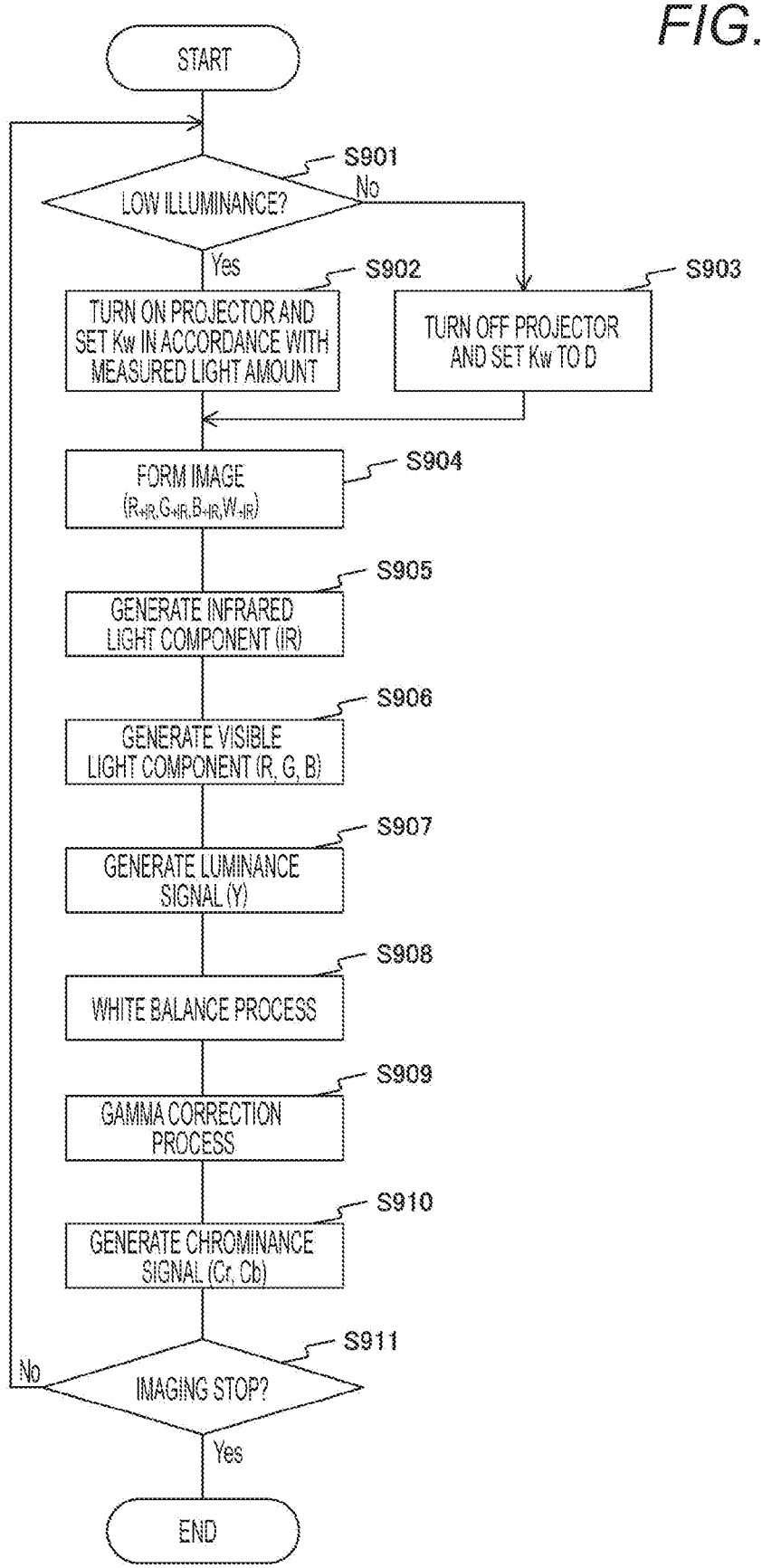
FIG. 11 is a flowchart showing an example of an operation performed by the imaging device according to the first embodiment.

FIG. 11 is a flowchart showing an example of an operation of the imaging device 100 according to the first embodiment. This operation starts in response to execution of a predetermined operation for imaging, for example.

The imaging device 100 determines whether or not current illuminance is low illuminance on the basis of a comparison between a measured light amount and the threshold Th1 (step S901). When it is determined that the current illuminance is low illuminance (step S901: Yes), the imaging device 100 turns on the infrared light projector 160, and sets the coefficient Kw to such a value which approaches "0" as the measured light amount decreases (step S902). On the other hand, when it is determined that the current illuminance is not low illuminance (step S901: No), the imaging device 100 turns off the infrared light projector 160, and sets the coefficient Kw to a value (D) other than "0". This step removes the infrared light component IR (step S903).

After step S902 or step S903, the imaging device 100 forms an image containing the pixel signals $R_{+IR}$, $B_{+IR}$, and $W_{+IR}$ (step S904). The imaging device 100 generates an infrared light component by weighted summation on the basis of the image (step S905). The imaging device 100 further generates the visible light components R, G and B by weighted summation (step S906).

Thereafter, the imaging device 100 generates the luminance signal Y from the infrared light component IR and the pixel signal $W_{+IR}$ (step S907). The imaging device 100 further performs the white balance process (step S908) and the gamma correction process (step S909) for the visible light components R, G and B to generate the chrominance signals Cr and Cb (step S910). After step S910, the imaging device 100 determines whether or not an operation for stopping imaging has been performed (step S911). The imaging device ends the action for imaging when it is determined that the operation for stopping imaging has been performed (step S911: Yes), or returns to step S901 when it is determined that the operation for stopping imaging has not been performed (step S911: No).

Figure 12:
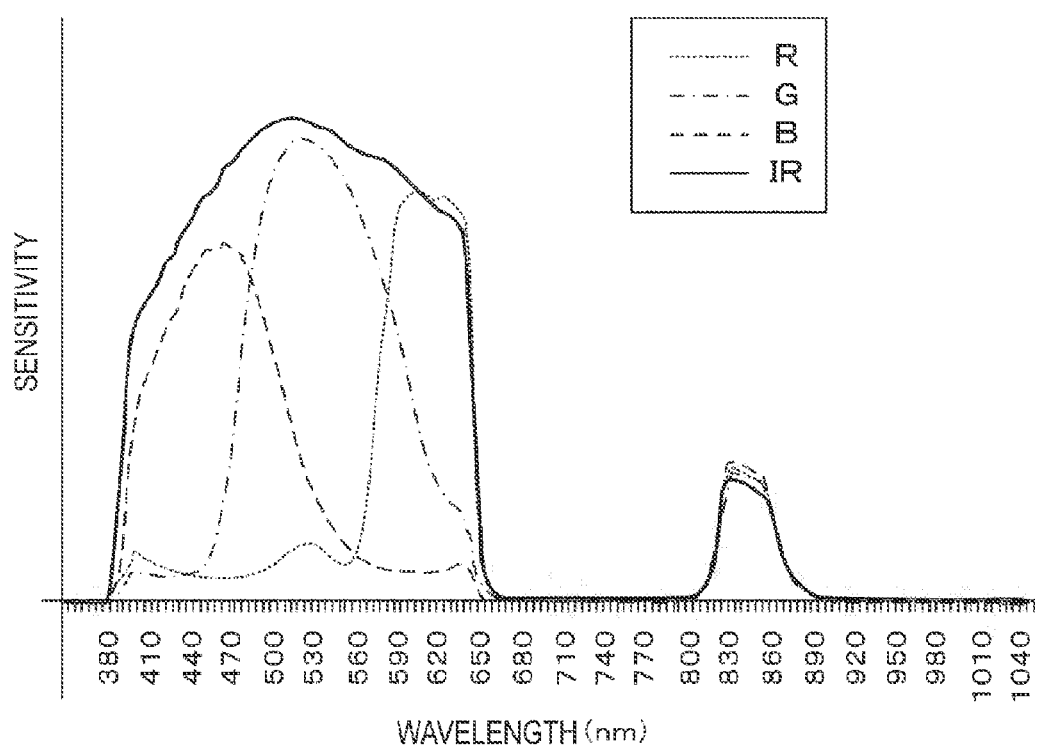
FIG. 12 is a graph showing an example of sensitivity characteristics for each pixel according to the first embodiment.

FIG. 12 is a graph showing an example of sensitivity characteristics for each pixel according to the first embodiment. A horizontal axis in the figure represents a wavelength of light, while a vertical axis represents a sensitivity of a pixel to light at a corresponding wavelength. In addition, a solid line in the figure shows sensitivity characteristics of the W pixel, while a fine dotted line shows sensitivity characteristics of the R pixel. In addition, an alternate long and short dash line shows sensitivity characteristics of the G pixel, while a rough dotted line shows sensitivity characteristics of the B pixel.

Sensitivity of the W pixel exhibits a peak for white visible light. On the other hand, sensitivities of the R pixel, G pixel, and B pixel exhibit peaks for red, green, and blue visible lights, respectively. Sensitivities of the R, G, B, and W pixels to infrared light are approximately equivalent to each other.

Red, green, and blue turn white after additive mixture with each other. Accordingly, the sum of the sensitivities of the R pixel, G pixel, and B pixel becomes a value close to the sensitivity of the W pixel. However, the sum of the sensitivities of the R pixel, G pixel, and B pixel is not necessarily equalized with the sensitivity of the W pixel as illustrated in FIG. 12. In addition, the sensitivities of the respective pixels to infrared light, which are approximately equivalent as described above, are not equalized with each other in a strict sense.

Accordingly, when a difference between a value of weighted summation of the pixel signals $R_{+IR}$, $G_{+IR}$, and $B_{+IR}$ by the same coefficient "0.5" and a weighted value of the pixel signal $W_{+IR}$ by a coefficient "0.5" is calculated, the infrared light component IR is not accurately separated.

Figure 13:
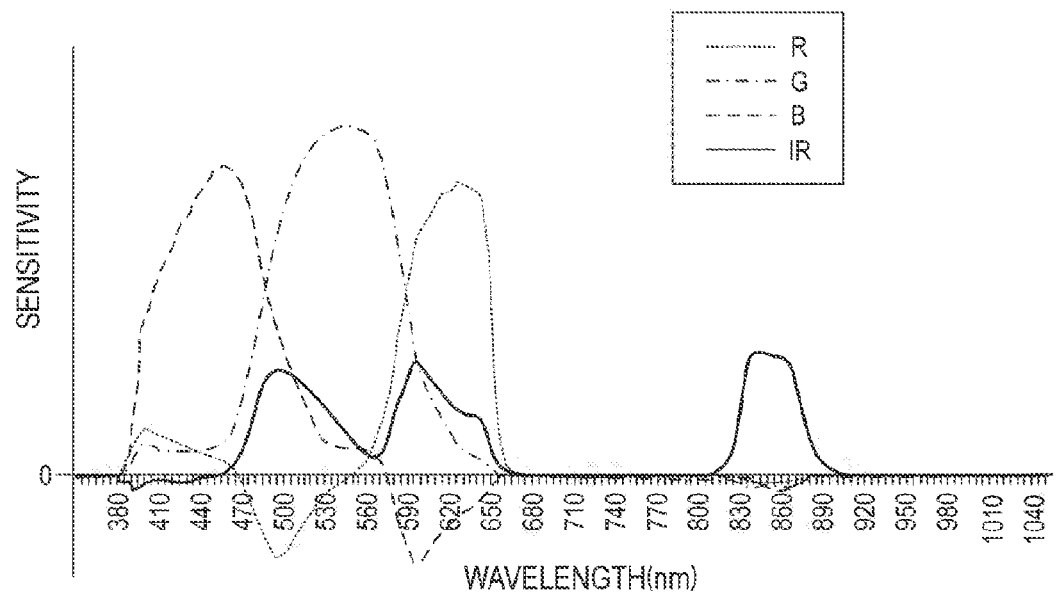
FIG. 13 is a graph showing an example of sensitivity characteristics after infrared light separation according to a comparative example of the first embodiment.

FIG. 13 is a graph showing an example of sensitivity characteristics after infrared light separation in a comparative example of the first embodiment. This comparative example is an example of weighted summation by using $K_{41}$, $K_{42}$, $K_{43}$, and $K_{44}$ set to 0.5, 0.5, 0.5, and −0.5 respectively. A horizontal axis in the figure shows a wavelength of light, while a vertical axis represents a sensitivity of a pixel to corresponding light. In an actual situation, an infrared light component and visible light components are separated not from sensitivities, but from pixel signals. In this figure, however, these components are indicated as components in sensitivities. A solid line in the figure shows sensitivity characteristics of the infrared light component IR, while a fine dotted line shows sensitivity characteristics of the visible light component R. In addition, a long and short dash line shows sensitivity characteristics of visible light component G, while a rough dotted line shows sensitivity characteristics of the visible light component B.

As illustrated in FIG. 12, the sum of the respective sensitivities of the R pixel, G pixel, and B pixel is not equalized with the sensitivity of the W pixel in many cases. Accordingly, when a difference between a weighted sum of all the pixel signals $R_{+IR}$, $G_{+IR}$, $B_{+IR}$ by "0.5" and a weighted value of $W_{+IR}$ by "0.5" is calculated in image data generated from these pixels, the infrared light component is not accurately separated. For example, as illustrated in FIG. 13, the infrared light component IR does not become "0" in a visible light range, in which condition an error from a true value increases.

On the other hand, the imaging device 100 determines the coefficients $K_{41}$, $K_{42}$, $K_{43}$, and $K_{44}$ such that the difference between a value of weighted summation of the respective sensitivities of the R pixel, G pixel, and B pixel to visible light and a weighted value of the sensitivity of the W pixel to visible light becomes smaller than a tolerance. This tolerance is a value equal to or smaller than the corresponding difference in the comparative example. Accordingly, the imaging device 100 more accurately separates the infrared light component than in the comparative example by performing weighted summation of respective pixel signals by coefficients determined in the foregoing manner.

Figure 14:
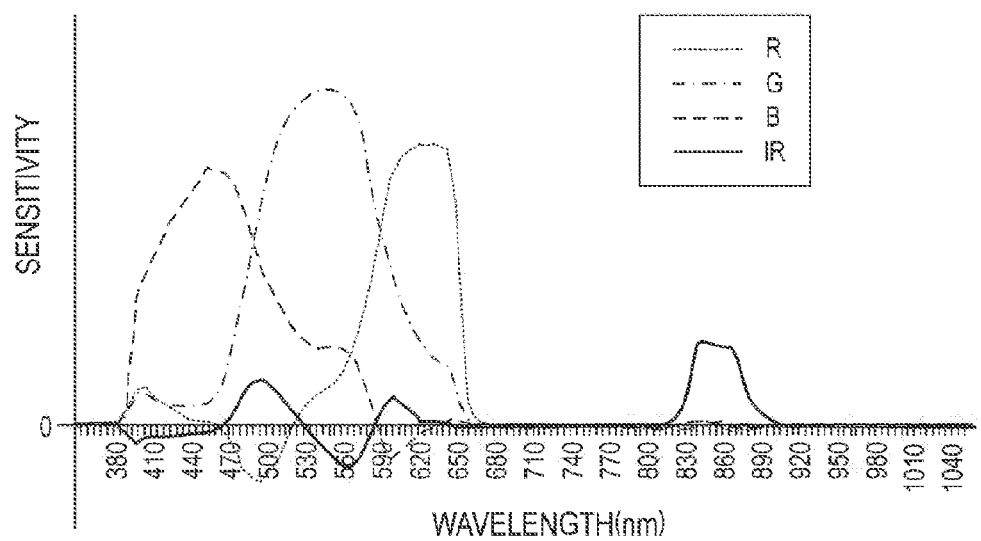
FIG. 14 is a view illustrating an example of sensitivity characteristics after infrared light separation according to the first embodiment.

FIG. 14 is an example of sensitivity characteristics after infrared light separation according to the first embodiment. As illustrated in the figure, the IR component generated by weighted summation approaches "0" in the visible light range, wherefore an error decreases in comparison with the comparative example illustrated in FIG. 12.

According to the first embodiment of the present technology, therefore, weighted summation of pixel signals is performed by such coefficients which decrease a difference between a value of weighted summation of the sensitivities of the R, G, and B pixels to visible light and a weighted value of the sensitivity of the W pixel to visible light. In this case, accurate separation of the infrared light component is achievable. Accordingly, the imaging device 100 improves color reproducibility of visible light, thereby improving quality of images.

[Modified Example]

According to the first embodiment, the imaging device 100 processes image data containing an arrangement of R pixels, G pixels, B pixels, and W pixels. However, the imaging device 100 may process image data containing a pixel arrangement of other combinations. The imaging device 100 according to a modified example is different from the imaging device 100 in the first embodiment in that image data containing an arrangement of pixels other than the R pixels, G pixels, B pixels, and W pixels.

FIG. 15 is a view illustrating an example of pixel arrangements according to the modified example of the first embodiment. For example, pixel arrangements to be used are classified into "one complementary color, two primary colors, and white", "two complementary colors, one primary color, and white", "three complementary colors and white", "one complementary color and three primary colors", "two complementary colors and two primary colors", and "complementary colors".

The "one complementary color, two primary colors, and white" is an arrangement containing one complementary color pixel, two primary color pixels, and one W pixel. The complementary color is constituted by any one of yellow (Ye), cyan (Cy), and magenta (Mg). On the other hand, the primary colors are constituted by two colors selected from R, G, and B. In case of a combination of Ye, R, G, and W, the coefficient $K_{44}$ is set to "0", and a value of weighted summation of Ye, R, and G by the coefficients $K_{41}$, $K_{42}$, and $K_{43}$, respectively, is obtained as the infrared light component IR. Note that the sign of $K_{41}$ is different from the signs of $K_{42}$ and $K_{43}$.

The "two complementary colors, one primary color, and white" is an arrangement containing two complementary color pixels, one primary color pixel, and one W pixel. In case of a combination of Ye, Cy, R, and W, the coefficient $K_{41}$ is set to "0", and a value of weighted summation of Cy, R, and W by the coefficients $K_{42}$, $K_{43}$, and $K_{44}$, respectively, is obtained as the infrared light component IR. Note that the sign of $K_{44}$ is different from the signs of $K_{42}$ and $K_{43}$.

The "three complementary colors and white" is an arrangement containing three complementary color pixels and one W pixel. In this arrangement, a value of weighted summation of Ye, Cy, Mg, and W by the coefficients $K_{41}$, $K_{42}$, $K_{43}$, and $K_{44}$, respectively, is obtained as the infrared light component IR. Note that the sign of $K_{44}$ is different from the signs of the other coefficients.

The "one complementary color and three primary colors" is an arrangement containing one complementary color pixel and three primary color pixels. In case of a combination of Ye, R, G, and B, the coefficient $K_{44}$ is set to "0", and a value of weighted summation of Ye, R, and G by the coefficients $K_{41}$, $K_{42}$, and $K_{43}$, respectively, is obtained as the infrared light component IR. Note that the sign of $K_{41}$ is different from the signs of $K_{42}$ and $K_{43}$.

The "two complementary colors and two primary colors" is an arrangement containing two complementary color pixels and two primary color pixels. In case of a combination of Ye, Cy, G, and B, the coefficient $K_{42}$ is set to "0", and a value of weighted summation of Ye, R, and G by the coefficients $K_{41}$, $K_{43}$, and $K_{44}$, respectively, is obtained as the infrared light component IR. Note that the sign of $K_{41}$ is different from the signs of $K_{43}$ and $K_{44}$.

The "complementary colors" is an arrangement containing three complementary color pixels and one primary color pixel. In case of a combination of Ye, Cy, Mg, and G, a value of weighted summation of Ye, Cy, Mg, and G by the coefficients $K_{41}$, $K_{42}$, $K_{43}$, and $K_{44}$, respectively, is obtained as the infrared light component IR. Note that the signs of $K_{41}$ and $K_{42}$ are different from the signs of $K_{43}$ and $K_{44}$.

According to the modified example of the first embodiment, therefore, infrared light components are accurately separated from image data containing a pixel arrangement other than R pixels, G pixels, B pixels, and W pixels.

<2. Second Embodiment>

According to the first embodiment, while the imaging device 100 obtains visible light components by weighted summation, differences between the infrared light component IR and the pixel signals $R_{+IR}$, $G_{+IR}$, and $B_{+IR}$ may be obtained as visible light components. The imaging device 100 according to a second embodiment is different from the imaging device 100 in the first embodiment in that differences between the infrared light component IR and the pixel signals $R_{+IR}$, $G_{+IR}$, and $B_{+IR}$ are obtained as visible light components.

Figure 16:
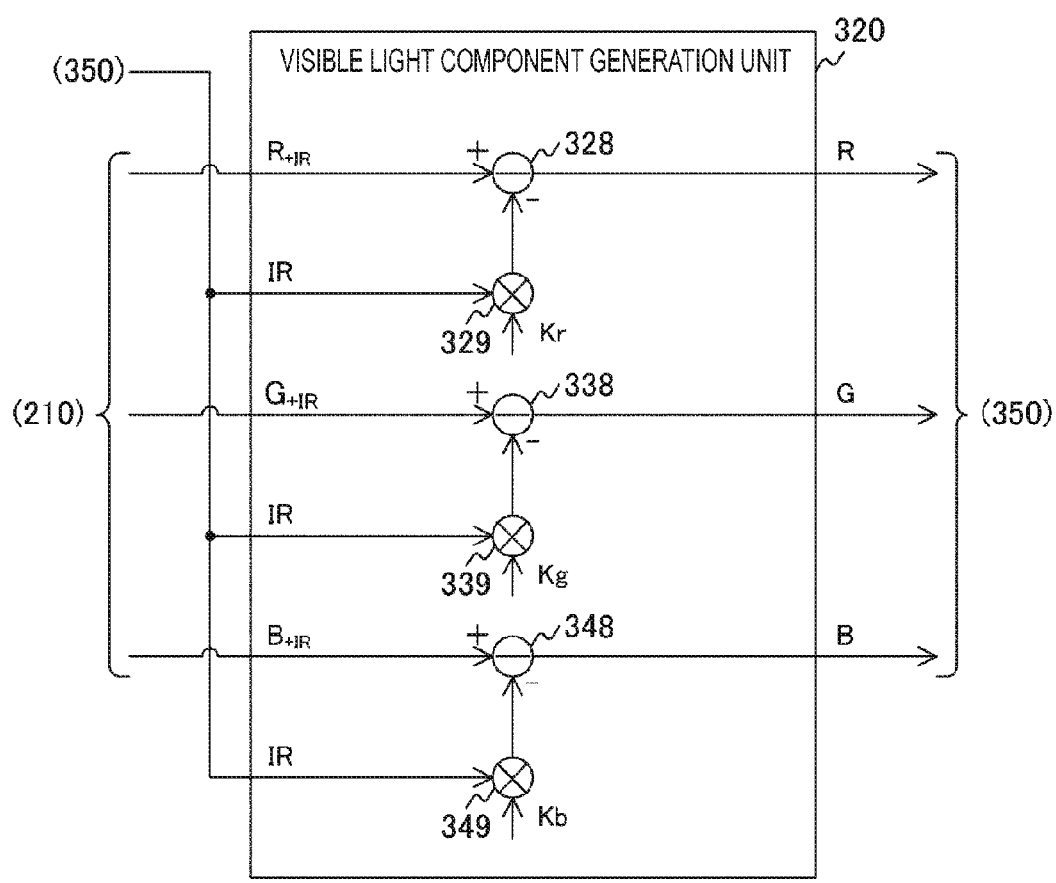
FIG. 16 is a view illustrating a configuration example of a visible light component generation unit according to a second embodiment.

FIG. 16 is a view illustrating a configuration example of a visible light component generation unit 320 according to the second embodiment. The visible light component generation unit 320 in the second embodiment includes subtracters 328, 338, and 348, and multipliers 329, 339, and 349.

In addition, the saturated pixel detection unit 350 in the second embodiment further supplies the infrared light component IR subjected to processing of Formula 11 to the visible light component generation unit 320.

The multiplier 329 multiplies the infrared light component IR by a predetermined coefficient Kr, and supplies a result of multiplication to the subtracter 328. The multiplier 339 multiplies the infrared light component IR by a predetermined coefficient Kg, and supplies a result of multiplication to the subtracter 338. The multiplier 349 multiplies the infrared light component IR by a predetermined coefficient Kb, and supplies a result of multiplication to the subtracter 348.

The subtracter 328 subtracts the result of multiplication of the multiplier 329 from the pixel signal $R_{+IR}$, and supplies a result of subtraction to the saturated pixel detection unit 350 as the visible light component R. The subtracter 338 subtracts the result of multiplication of the multiplier 339 from the pixel signal $G_{+IR}$, and supplies a result of subtraction to the saturated pixel detection unit 350 as the visible light component G. The subtracter 348 subtracts the result of multiplication of the multiplier 349 from the pixel signal $B_{+IR}$, and supplies a result of subtraction to the saturated pixel detection unit 350 as the visible light component B.

Each of the coefficients Kr, Kg, and Kb is so determined as to sufficiently remove the infrared light component IR from a pixel signal by weighted summation. These coefficients Kr, Kg, and Kb are set to such values which increase as sensitivities of the R, G, and B pixels to infrared light increase. For example, each of the coefficients Kr, Kg, and Kb is set to "1.15".

Note that the control unit 150 may control the coefficients Kr, Kg, and Kb in accordance with ratios of infrared light contained in ambient light to visible lights. This control achieves a preferable balance between a high S/N ratio and color reproducibility.

Figure 17:
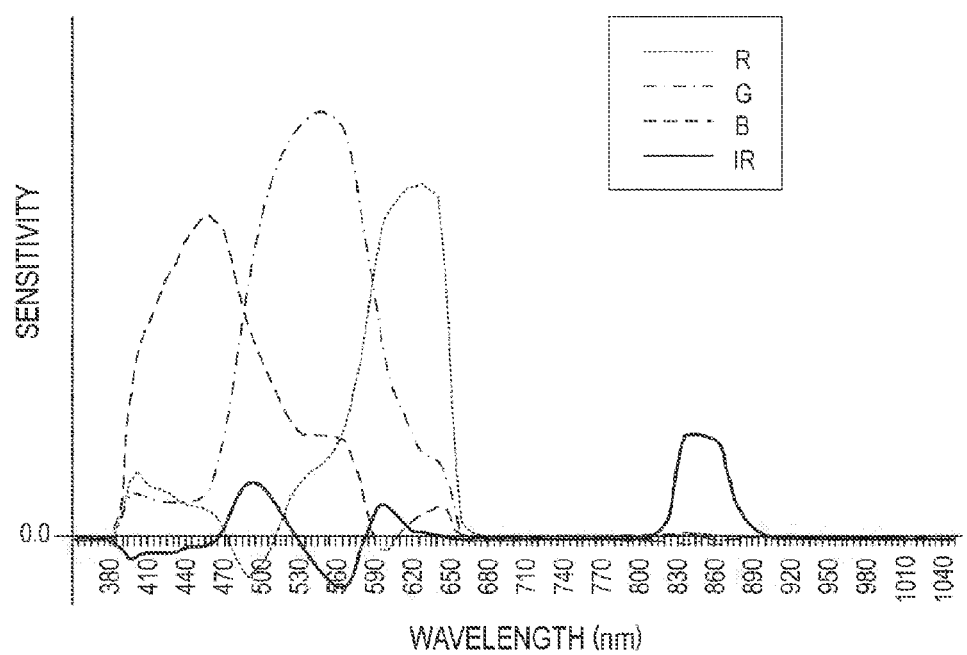
FIG. 17 is a view illustrating an example of sensitivity characteristics after infrared light separation according to the second embodiment.

FIG. 17 is a view illustrating an example of sensitivity characteristics after infrared separation according to the second embodiment. As illustrated in the figure, the infrared light component IR becomes a value close to "0" in the visible light range, wherefore sensitivity characteristics improve.

According to the second embodiment of the present technology, therefore, the imaging device 100 calculates, as visible light components, differences between pixel signals and values of an infrared light component weighted by coefficients corresponding to sensitivities to infrared light. Accordingly, visible light components are accurately separable.

<3. Third Embodiment>

The imaging device 100 according to the first embodiment generates an infrared light component and visible light components by a matrix operation using a 4-row×4-column matrix. However, accurate calculation of both the infrared light component and the visible light components may be difficult when this matrix operation is used. For example, accuracy of visible light components decreases when coefficients are determined with emphasis on improvement of accuracy of an infrared light component. On the other hand, accuracy of an infrared light component decreases when coefficients are determined with emphasis on improvement of accuracy of visible light components. When the imaging device 100 extends the number of columns of the matrix used for calculation, accuracy of both the infrared light component and the visible light components increases. The imaging device 100 according to a third embodiment is different from the imaging device 100 in the first embodiment in that an extended matrix is used.

Following discussion develops on the assumption that virtual color spaces in three or more colors are provided. For example, sensitivity characteristics of four colors of R, G, B, and W are considered herein as sensitivity characteristics of a sensor according to the first and second embodiments. In this case, a vector space V expressed by four color-matching functions (hereinafter referred to as "virtual visual space") is defined herein on the assumption that these color-matching functions are present based on sensitivity characteristics shown in FIG. 12. The virtual visual space is called a "virtual" space to indicate extension to an infrared light range other than a visible light range, and is used for convenience to make distinction between discussion about a space of three primary colors and discussion about an infrared light range not generally recognizable. In other words, the four color-matching functions are represented by four vectors in the virtual visual space, in which condition arbitrary colors within the virtual visual space are represented by linear combinations of the four vectors. This applies to general mathematical extension from discussion about a visual space of three primary colors R, G, and B.

The first and second embodiments herein are developed on the assumption that a following relational expression holds in color reproduction processing so as to separate only infrared light components from pixel signals on which the infrared light components are superimposed, and achieve optical matching with RGB spectral characteristics obtained by an infrared light cut filter.

$$V \rightarrow \text{linear mapping of } V (= \text{linear transformation}); f \quad \text{(Formula 12)}$$

Moreover, discussion in the first and second embodiments develops in consideration of one-to-one correspondence between a vector space and another vector space in a following manner to practically perform numerical calculations. In more detail, utilized in the respective embodiments is one-to-one correspondence (bijection) in a mathematical sense between the vector space V expressed by color-matching functions and an n-dimensional numerical vector space $R^n$. More specifically, considered herein is a 151-dimensional $R^{151}$ space exhibiting one-to-one correspondence between standard bases of the numerical vector space and divisions of respective spectral characteristics data divided by 5 nanometers in an observed wavelength range from 350 nanometers (nm) to 1100 (nm). In this space, respective color-matching functions are redefined as numerical vectors. This definition is approximate definition. However, no problem occurs as long as sufficient resolution is determined.

Discussed herein is linear mapping f in an RGBW-$R^{n(=151)}$ space capable of handling these numerical values. More specifically, in a representation matrix of f shown below, a 4-row×4-column matrix $H_{ij}$ is present between input lights $R\_{IR}$, $G\_{IR}$, $B\_{IR}$, and $W\_{IR}$ on each of which an infrared light component is superimposed, and components R, G, B, and W from each of which an infrared light component is separated.

[Mathematical Formula 1]

$$\begin{pmatrix} R_1 \dots R_j \dots R_n \\ G_1 \dots G_j \dots G_n \\ B_1 \dots B_j \dots B_n \\ W_1 \dots W_j \dots W_n \end{pmatrix} = \quad \text{(Formula 13)}$$

$$\begin{pmatrix} H_{11} H_{12} H_{13} H_{14} \\ H_{21} H_{22} H_{23} H_{24} \\ H_{31} H_{32} H_{33} H_{34} \\ H_{41} H_{42} H_{43} H_{44} \end{pmatrix} \begin{pmatrix} R_{1\_IR} \dots R_{j\_IR} \dots R_{n\_IR} \\ G_{1\_IR} \dots G_{j\_IR} \dots G_{n\_IR} \\ B_{1\_IR} \dots B_{j\_IR} \dots B_{n\_IR} \\ W_{1\_IR} \dots W_{j\_IR} \dots W_{n\_IR} \end{pmatrix}$$

The subscript "_IR" herein indicates that an infrared light is contained. Paying attention now to comparison with the first embodiment, output in the first embodiment illustrated in FIG. 6a and FIG. 6b contains not a W part but an IR part. However, on the assumption that IR is allowed to be represented by an arbitrary linear combination of RGBW, this output is considered as output equivalent to Formula 13. In this example, output is set to W not containing an infrared light component to simply match output with input. In addition, each of the coefficients K in the first embodiment corresponds to corresponding one of coefficients H in the foregoing representation matrix. Accordingly, a following formula is obtained when the calculation in the first embodiment is expressed in another way which further contains the infrared light component IR by utilizing Formula 13.

[Mathematical Formula 2]

$$\begin{pmatrix} r_1 \dots R_j \dots r_n \\ g_1 \dots g_j \dots g_n \\ b_1 \dots b_j \dots b_n \\ w_1 \dots w_j \dots w_n \end{pmatrix} = \begin{pmatrix} H_{11} H_{12} H_{13} H_{14} \\ H_{21} H_{22} H_{23} H_{24} \\ H_{31} H_{32} H_{33} H_{34} \\ H_{41} H_{42} H_{43} H_{44} \end{pmatrix} \quad \text{(Formula 14)}$$

$$\begin{pmatrix} R_1 + IR_1 \dots R_j + IR_j \dots R_n + IR_n \\ G_1 + IR_1 \dots G_j + IR_j \dots G_n + IR_n \\ B_1 + IR_1 \dots B_j + IR_j \dots B_n + IR_n \\ W_1 + IR_1 \dots W_j + IR_j \dots W_n + IR_n \end{pmatrix} =$$

$$\begin{pmatrix} H_{11} H_{12} H_{13} H_{14} \\ H_{21} H_{22} H_{23} H_{24} \\ H_{31} H_{32} H_{33} H_{34} \\ H_{41} H_{42} H_{43} H_{44} \end{pmatrix} \begin{pmatrix} R_1 \dots R_j \dots R_n \\ G_1 \dots G_j \dots G_n \\ B_1 \dots B_j \dots B_n \\ W_1 \dots W_j \dots W_n \end{pmatrix} +$$

$$\begin{pmatrix} H_{11} H_{12} H_{13} H_{14} \\ H_{21} H_{22} H_{23} H_{24} \\ H_{31} H_{32} H_{33} H_{34} \\ H_{41} H_{42} H_{43} H_{44} \end{pmatrix} \begin{pmatrix} IR_1 \dots IR_j \dots IR_n \\ IR_1 \dots IR_j \dots IR_n \\ IR_1 \dots IR_j \dots IR_n \\ IR_1 \dots IR_j \dots IR_n \end{pmatrix}$$

For separation of infrared light components, a term constituted by the infrared light components IR in a final row in Formula 14 needs to become zero. Generally, Formula 14 is easily solved by utilizing a pseudo inverse matrix under spreadsheet software or the like. This process is mathematically equivalent to a least-square method described below. While expressed in different manners, the formula used in the first embodiment and Formula 14 are essentially equivalent.

Details of this embodiment are now discussed. Concerning transformation of Formula 14, expression of an output section is changed from R, G, B, and W in the first embodiment to r, g, b, and r. This expression is adopted to make a distinction in the following point. For ideal separation of an infrared light component, an input signal containing no infrared light component (R, G, B, W) needs to be matched with output (r, g, b, w). In this case, the matching is required under "a condition of cancellation of an IR term corresponding to a second term of Formula 14". In other words, an error generally has a great effect on matching between apart of input and output under this limiting condition (setting IR term in second term to all "0"). Accordingly, when attention is paid to an ith component of Formula 14, all of following Formulae 15 through 22 need to hold in a full wavelength range (i: 1 to 151) for an ideal infrared light separation process.

$$r_i = H_{11}R_i + H_{12}G_i + H_{13}B_i + H_{14}W_i = R_i \quad \text{(Formula 15)}$$

$$g_i = H_{21}R_i + H_{22}G_i + H_{23}B_i + H_{24}W_i = G_i \quad \text{(Formula 16)}$$

$$b_i = H_{31}R_i + H_{32}G_i + H_{33}B_i + H_{34}W_i = B_i \quad \text{(Formula 17)}$$

$$w_i = H_{41}R_i + H_{42}G_i + H_{43}B_i + H_{44}W_i = W_i \quad \text{(Formula 18)}$$

$$0 = (H_{11} + H_{12} + H_{13} + H_{14})IR_i \quad \text{(Formula 19)}$$

$$0 = (H_{21} + H_{22} + H_{23} + H_{24})IR_i \quad \text{(Formula 20)}$$

$$0 = (H_{31} + H_{32} + H_{33} + H_{34})IR_i \quad \text{(Formula 21)}$$

$$0 = (H_{41} + H_{42} + H_{43} + H_{44})IR_i \quad \text{(Formula 22)}$$

Figure 18:
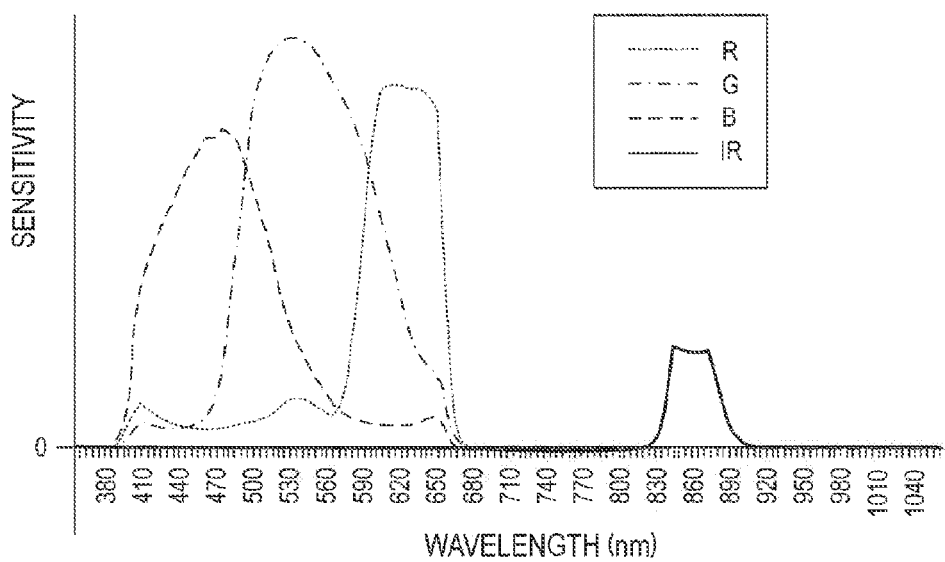
FIG. 18 is a graph showing an example of ideal sensitivity characteristics according to a third embodiment.

FIG. 18 is a graph showing an example of ideal sensitivity characteristics where formulae 15 through 22 hold in the third embodiment. According to the first embodiment, the unique coefficient matrix $H_{ij}$ producing a minimum error is obtained from an ideal state under these preconditions. However, according to a result of spectrum characteristics obtained in FIG. 11, there arises a problem that RGB characteristics in the visible light range have been greatly varied from the corresponding characteristics before separation. In other words, for each i, it is indicated that $r_i$, $g_i$, $b_i$, and $w_i$ do not match with $R_i$, $B_i$, $G_i$, and $W_i$. An error produced in the course of solving the foregoing matrix may cause a problem of color reproduction in the visible light range.

For overcoming this problem, an alternative method adopted in this embodiment redefines bases of a virtual visual space to introduce new linear mapping and further minimize the error.

Figure 19A:
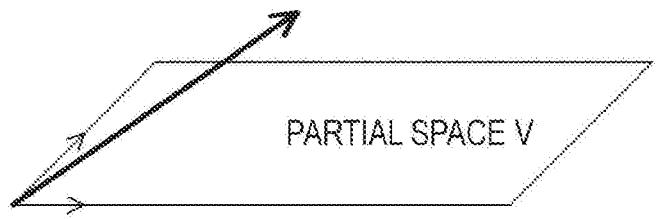
FIGS. 19a, 19b, 19c, 19d, and 19e are a view explaining a generation step of a calculation formula according to the third embodiment.
Figure 19B:
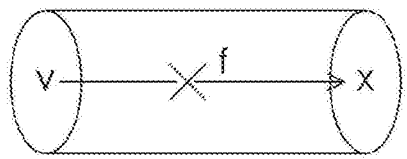
Figure 19C:
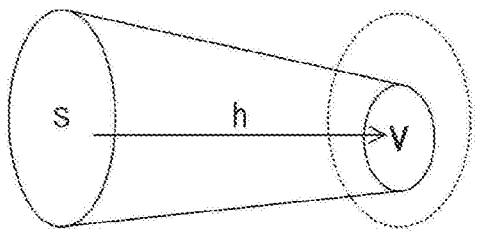

Initially, a problem of the error is geometrically considered herein. The foregoing condition is met when representation of respective colors subjected to ideal infrared light separation is allowed in a virtual visual space constituted by respective spectrum characteristics of R, G, B, and W pixels on which infrared light is superimposed (hereinafter referred to as "color-matching functions"). In other words, all color reproduction processes containing infrared light separation are uniquely determined by the representation matrix $H_{ij}$ of the linear mapping f. However, the fact that a great error is actually present indicates that representation of ideal colors is difficult in this virtual visual space. In other words, the virtual visual space expressed by four color-matching functions in a part in FIG. 19a represents RGBW colors on which actual infrared light components are superimposed (sensor spectrum sensitivities). In this condition, RGBW colors from which infrared light components are separated are considered as colors deviating from this partial space. This is the same discussion as discussion of a general three primary color space. In colorimetry, deviation from an RGB three primary color space is quantified by using a quality factor of Neugebauer.

According to the first and second embodiments, however, an error is not necessarily produced in the entire wavelength range (or entire virtual visual space). Actually, a preferable result is obtained in the infrared light range. This result is achieved, in a sense, by a process which gives priority to separation of an infrared light component at the expense of the visible light range. Accordingly, considered in the third embodiment is to correct the visible light range by utilizing the separation results of the first and second embodiments. It should be noted herein that desired color reproduction is difficult to realize in the visible light range only by linear transformation of the visible light RGB space, such as a typical example of a simple linear matrix, as apparent from characteristics of a matrix. This difficulty comes from the fact that synthesis mapping of linear transformations f and m, for example, also becomes linear transformation. Even when additional linear transformation (such as RGB 3×3 linear matrix) is performed in a latter processing part, this transformation only deviates further from an original optimum solution obtained in the entire wavelength range (i.e., error increases). It is obvious that optimization limited to a specific range is effective. However, distortion may be caused in other ranges by this optimization. Only in a limited condition allowing this antinomic processing, a combination of linear transformations is effective within a range in this limited condition. This limitation comes from a restriction that a color out of a space (presence of X space different from V is assumed herein) is difficult to be represented by the transformation $H_{ij}$ for virtual visual space transformation V→V (=linear transformation) in a geometrical sense.

As apparent from the foregoing discussion, extension of a space is necessary. It is therefore considered herein to add appropriate bases to the virtual visual space V expressed by $R\_{IR}$, $G\_{IR}$, $B\_{IR}$, and $W\_{IR}$ on each of which an infrared light component is superimposed to extend the virtual visual space V to an S space containing a partial space X expressed by RGBW subjected to ideal infrared light separation. In other words, appropriate bases are given to allow extension to a desirable space which contains X and V as partial spaces of S. In this case, following relational expressions hold between V, X, and S. Note that bases are not uniquely determined in general.

$$V \subset S \quad \text{(Formula 23)}$$

$$X \subset S \quad \text{(Formula 24)}$$

For example, the V space is a space expressed by color-matching functions having a basis of ($R\_{IR}$, $G\_{IR}$, $B\_{IR}$, $W\_{IR}$). Accordingly, the space is initially redefined with bases of R, G, B, and IR calculated in the first and second embodiments in a rather authoritative manner. This redefinition is trivial in consideration that mapping in the first and second embodiments is (self) isomorphous mapping of V→V in a substantial sense. Motivation of this redefinition comes from an intention for re-construction of the V space with attention paid to a separated infrared light component on the basis of the fact that preferable approximation results are obtained in the infrared light range in both the first and second embodiments as described above. In addition, from a different viewpoint of a polynomial space $P^4_4$, the V space having the foregoing bases is extended to a $P^{14}_4$ space by addition of bases of the polynomial space $P^4_4$ with use of R, G, B, and IR, in consideration of linear independency and easiness of calculations and constitution of hardware. This $P^{14}_4$ space is represented by (R', G', B', IR', R'$^2$, G'$^2$, B'$^2$, IR'$^2$, R'G', R'B', R' IR', G' B', G' IR', B' IR').

In this case, each subscript ' attached to R, G, B, and IR indicates a state that the corresponding component R, G, B, or IR has been subjected to a normalization process. The normalization process will be described below. Note that each of R'$^2$, G'$^2$, B'$^2$, IR'$^2$, R'G', R'B', R'IR', G'B', G'IR', and B'IR' is an example of a high dimension component according to the appended claims.

In addition, (R', G', B', IR') is a vector in the V space generated by linear transformation in the first or the second embodiment. It should be noted that the V space in this case is redefined as the $P^4_4$ space having a basis of this vector. In other words, the V space is congruent with the $P^4_4$ space, and is contained in a $P^{144}_4$ space.

As described above, extension is realized in a manner containing the virtual visual space V representing a spectral sensitivity of an actual sensor. Considered next is whether the S space containing the X space expressed by RGBW subjected to ideal infrared light separation becomes the $P^{14}_4$ space. Discussion herein develops under following estimation. It is considered that the X space expressed by the RGBW colors subjected to ideal infrared light separation as illustrated in FIG. 18, and the V space illustrated in FIGS. 14 and 17 by way of example are not completely different spaces not crossing each other, but spaces partially overlapping with each other on the basis of results of these figures. In this case, these spaces are equivalent in dimension, and partially overlapping with each other as expressed in a following formula, wherefore it is reasonable to assume that the $P^{14}_4$ space extended from the V space is the S space. Parts b through in FIG. 19e schematically illustrates this assumption.

$$dim(V)=dim(X) \quad \text{(Formula 25)}$$

In the above formula, dim( ) represents a function which returns a dimension of a space.

Figure 19D:
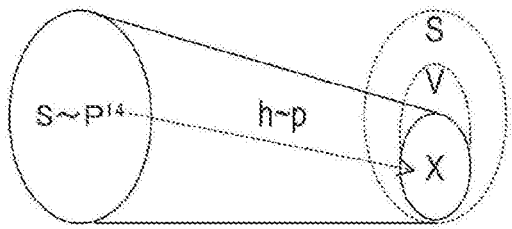
Figure 19E:
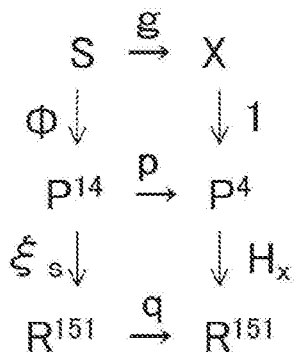

An assumption that the X space is contained in the S space (i.e., $P^{14}_4$ space) is indicated by broken lines in the part in FIG. 19d. In this case, bijection of each of the polynomial spaces $P^4_4$ and $P^{14}_4$ to a numerical vector space is allowed as in the part e in the figure similarly to the foregoing discussion. Accordingly, linear mapping q expressed by a following formula is present and defines a representation matrix of mapping m.

[Mathematical Formula 3]

$$q:R^{151} \to R^{151}, q=\eta_x \circ p \circ \xi_s^{-1} \sim \eta_x \circ l \circ m \circ \phi^{-1} \circ \xi_s^{-1} \quad \text{(Formula 26)}$$

More specifically, when following conditions expressed by following formulae hold for linear mapping m:S→X, linear mapping q of $R^{151} \to R^{151}$ is present, and allows definition of a representation matrix of mapping m.

[Mathematical Formula 4]

Bijection $\phi:S \to P^{14}_4$ And Bijection $\xi_s:P^{14}_4 \to R^{151}$

Identity mapping $1:X \to P^4_4$ And Bijection
$\eta_x:P^4_4 \to R^{151}$ (Formula 27)

As apparent from the foregoing discussion, the above-mentioned issue of mapping from the S space containing the V space to the X space represented by RGBW subjected to ideal infrared light separation is realizable. Accordingly, ideal color reproduction is achievable by using RGB and IR (or W) subjected to infrared light separation in the first and second embodiments. It is considered in this embodiment that this assumed $P^{14}_4$ (or S) is reasonable in view of "excellence in results", and sufficient in a substantial sense rather than in mathematically strict sense.

A representation matrix is now generated. Infrared light components are already separated in the first and second embodiments. Accordingly, color reproduction processing in the visible light range is appropriately carried out by performing an operation of a matrix constituted by the foregoing basis vectors with use of input signals constituted by the visible light components R, G, and B and the infrared light component IR separated in a latter part of the first and second embodiments. In other words, desired color reproduction is easily achievable by performing a matrix operation process shown in FIG. 20 for the results obtained in the first and second embodiments under a flow of a hardware process described below.

In this case, (r, g, b, ir) is an output signal, while (R'$^2$, G'$^2$, B'$^2$, IR'$^2$, R'G', R'B', R'IR', G'B', G'IR', B'IR') is an input signal.

Input signals in an actual situation are constituted by the signals R, G, B, and IR in a state from which infrared light components are separated as in the first and second embodiments. The imaging device 100 performs, as the normalization process, a process for division by a norm N of a vector (R, G, B, IR) constituted by respective pixel values. Components subjected to normalization correspond to R', G', B', and IR' described above.

$$R'=R/N \quad \text{(Formula 28)}$$

$$G'=G/N \quad \text{(Formula 29)}$$

$$N'=B/N \quad \text{(Formula 30)}$$

$$IR'=IR/N \quad \text{(Formula 31)}$$

$$N=(R^2+G^2+B^2+IR^2)^{1/2} \quad \text{(Formula 32)}$$

FIG. 21 is a view showing an example of calculation formulae used by an infrared light separation unit according to the third embodiment. As apparent from the example in the figure, a matrix operation is performed by using results of formulae 28 to 31. Respective coefficients of a 4×14 matrix in the figure are calculated beforehand from a numerical vector space $R^{151}$ by using a pseudo-inverse matrix under spreadsheet software or the like, similarly to the foregoing discussion. More specifically, 14 basis vectors are calculated beforehand based on input data corresponding to results of spectral characteristics subjected to infrared light separation and calculated in the first and second embodiments (FIG. 10a, 10b, 10c, 10d, 10d, 10e or 17). Thereafter, coefficients are easily obtained by using a pseudo-inverse matrix (n: 151 in this embodiment) on the basis of the formulae illustrated in FIG. 20 under spreadsheet software similarly to the foregoing discussion.

As described above, accurate color reproduction in visible light and infrared light ranges is achievable in this embodiment by combining configurations of the first or second embodiment for extension of a space to be handled, and acquisition of color reproduction effect in the entire wavelength range.

Figure 22:
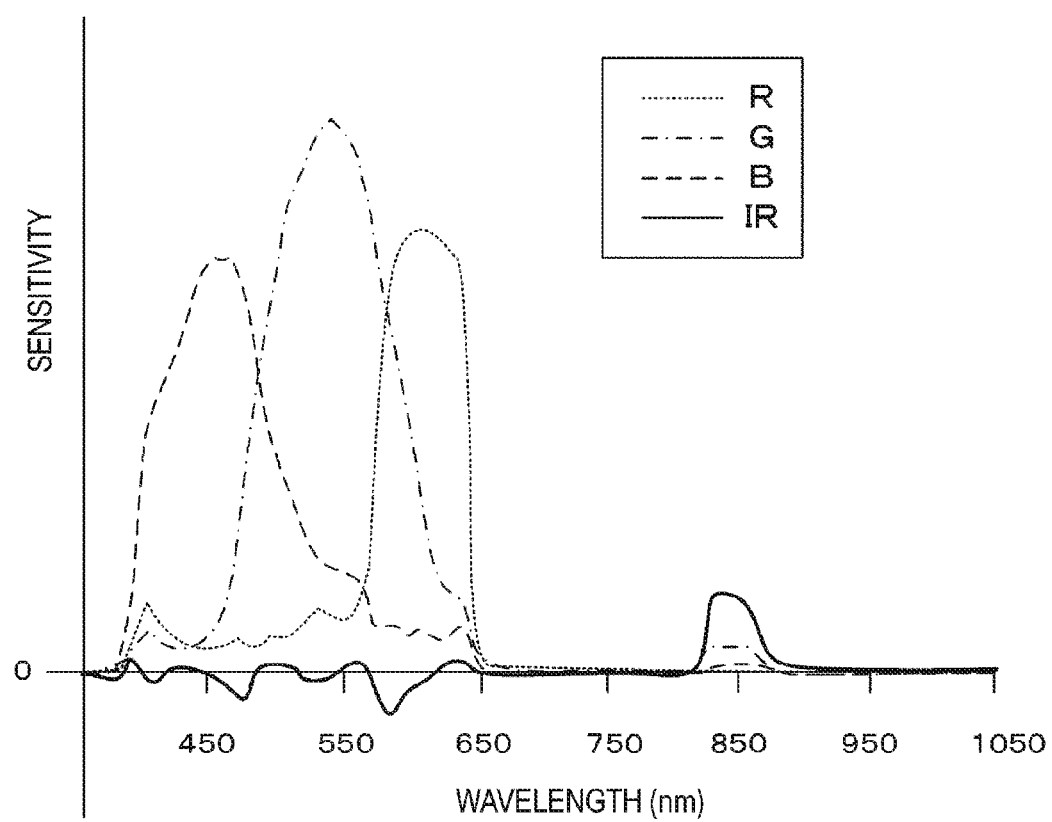
FIG. 22 is a view illustrating an example of sensitivity characteristics after infrared light separation according to the third embodiment.

FIG. 22 is a view illustrating an example of sensitivity characteristics obtained after infrared light separation in the third embodiment. As apparent from the figure, sensitivity characteristics approach ideal characteristics with extremely high accuracy in the entire wavelength range in comparison with the sensitivity characteristics in FIGS. 14 and 17.

Figure 23:
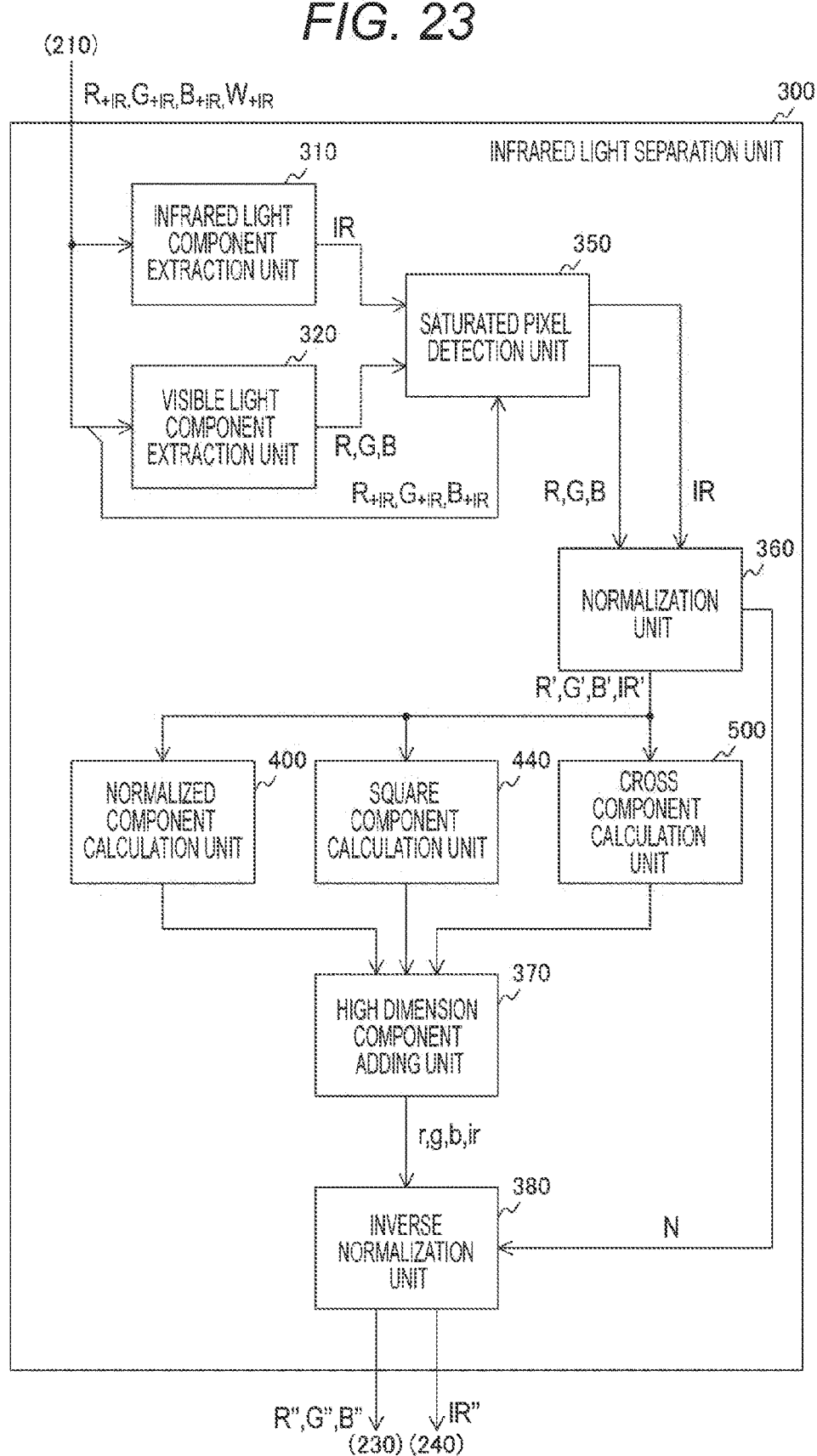
FIG. 23 is a block diagram illustrating a configuration example of the infrared light separation unit according to the third embodiment.

FIG. 23 is a block diagram illustrating a configuration example of the infrared light separation unit 300 according to the third embodiment. The infrared light separation unit 300 in the third embodiment is different from the corresponding unit in the first embodiment in that a normalization unit 360, a normalized component calculation unit 400, a square component calculation unit 440, across component calculation unit 500, a high dimension component adding unit 370, and an inverse normalization unit 380 are added.

The normalization unit 360 normalizes the visible light components R, G, and B, and the infrared light component IR by using the formulae 28 through 31 presented by way of example. The normalization unit 360 supplies the respective components R', G', B', and IR' subjected to normalization to the normalized component calculation unit 400, the square component calculation unit 440, and the cross component calculation unit 500, and supplies the norm N to the inverse normalization unit 380.

The normalized component calculation unit 400 performs calculation for the visible light components R', G', B', and IR' by using a 4-row×4-column matrix, and supplies a result of calculation to the high dimension component adding unit 370.

The square component calculation unit 440 squares each of the visible light components R', G', B', and IR' to generate square components, performs calculation for the generated square components by using a 4-row×4-column matrix, and supplies a result of calculation to the high dimension component adding unit 370.

The cross component calculation unit 500 multiplies one of each pair of the visible light components R', G', B', and IR' by the other of the corresponding pair to generate six components as cross components, and performs calculation for these cross components by using a 4-row×6-column matrix. The cross component calculation unit 500 supplies a result of calculation to the high dimension component adding unit 370.

The high dimension component adding unit 370 sums the results of calculation received from the normalized component calculation unit 400, the square component calculation unit 440, and the cross component calculation unit 500. The high dimension component adding unit 370 supplies a result of summation to the inverse normalization unit 380 as high accuracy components r, g, b, and ir.

The inverse normalization unit 380 performs an inverse normalization process for multiplying each of the high accuracy components r, g, b, and ir by the norm N. The inverse normalization unit 380 supplies visible light components R", G", and B" subjected to inverse normalization to the white balance processing unit 230, and supplies an infrared light component IR" subjected to inverse normalization to the luminance signal generation unit 240.

While the imaging device 100 is configured to include both the square component calculation unit 440 and the cross component calculation unit 500, the imaging device 100 may include only either one of these units 440 and 500.

The normalization unit 360, the normalized component calculation unit 400, the square component calculation unit 440, the cross component calculation unit 500, the high dimension component adding unit 370, and the inverse normalization unit 380 correct infrared light components and visible light components to decrease errors. Note that a circuit constituted by the normalization unit 360, the normalized component calculation unit 400, the square component calculation unit 440, the cross component calculation unit 500, the high dimension component adding unit 370, and the inverse normalization unit 380 is an example of a correction unit according to the appended claims.

Figure 24:
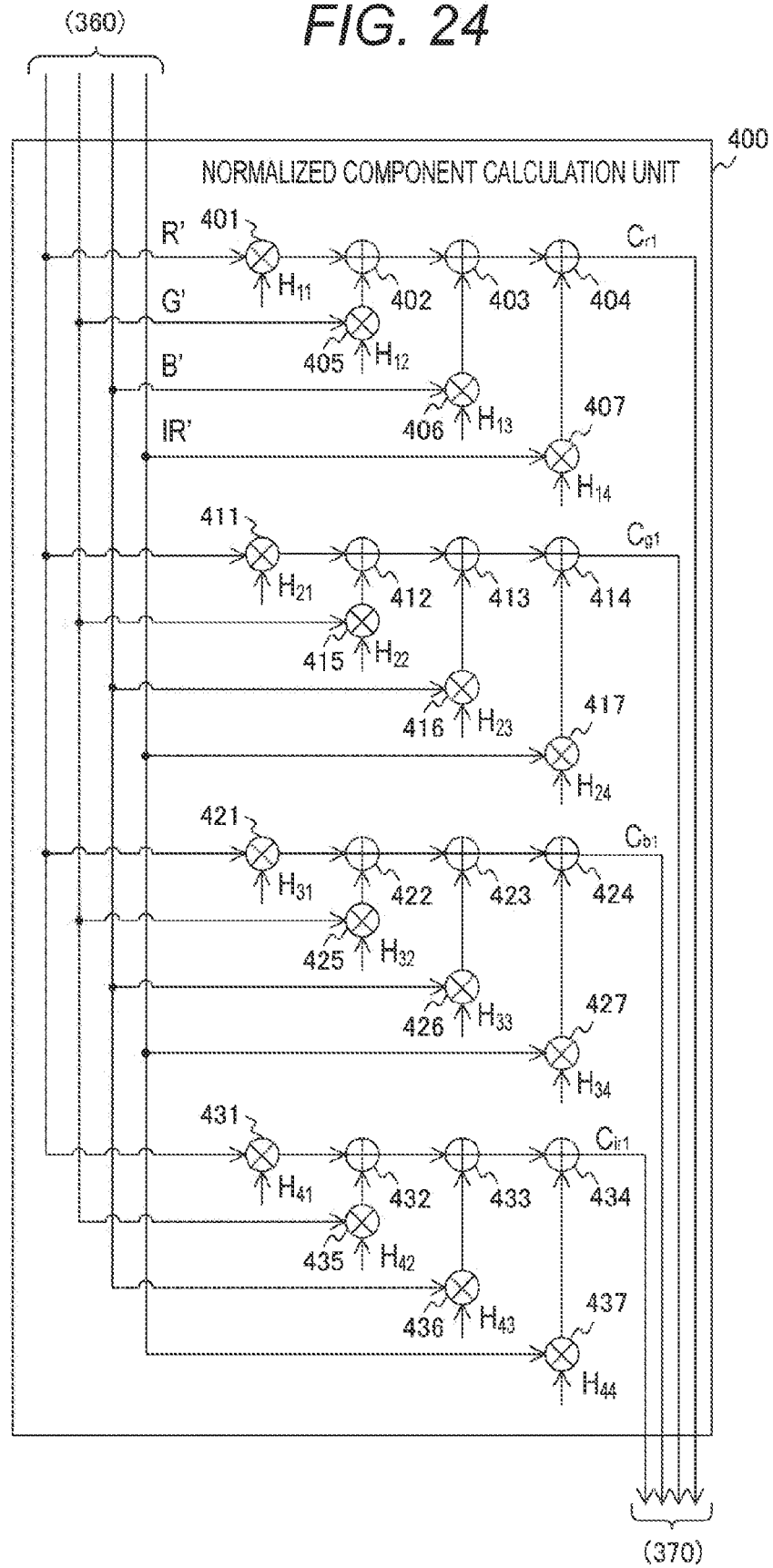
FIG. 24 is a view illustrating a configuration example of a normalized component calculation unit according to the third embodiment.

FIG. 24 is a view illustrating a configuration example of the normalized component calculation unit 400 according to the third embodiment. The normalized component calculation unit 400 includes multipliers 401, 405, 406, 407, 411, 415, 416, and 417, and adders 402, 403, 404, 412, 413, and 414. The normalized component calculation unit 400 further includes multipliers 421, 425, 426, 427, 431, 435, 436, and 437, and adders 422, 423, 424, 432, 433, and 434.

The multipliers 401, 405, 406, and 407, and the adders 402, 403, and 404 perform weighted summation of R', G', B', and IR' by coefficients $H_{11}$, $H_{12}$, $H_{13}$, and $H_{14}$. A result of summation $C_{r1}$ thus obtained is supplied to the high dimension component adding unit 370.

The multipliers 411, 415, 416, and 417, and the adders 412, 413, and 414 perform weighted summation of R', G', B', and IR' by coefficients $H_{21}$, $H_{22}$, $H_{23}$, and $H_{24}$. A result of summation $C_{g1}$ thus obtained is supplied to the high dimension component adding unit 370.

The multipliers 421, 425, 426, and 427, and the adders 422, 423, and 424 perform weighted summation of R', G', B', and IR' by coefficients $H_{31}$, $H_{32}$, $H_{33}$, and $H_{34}$. A result of summation $C_{b1}$ thus obtained is supplied to the high dimension component adding unit 370.

The multipliers 431, 435, 436, and 437, and the adders 432, 433, and 434 perform weighted summation of R', G', B', and IR' by coefficients $H_{41}$, $H_{42}$, $H_{43}$, and $H_{44}$. A result of summation $C_{ir1}$ thus obtained is supplied to the high dimension component adding unit 370.

Figure 25:
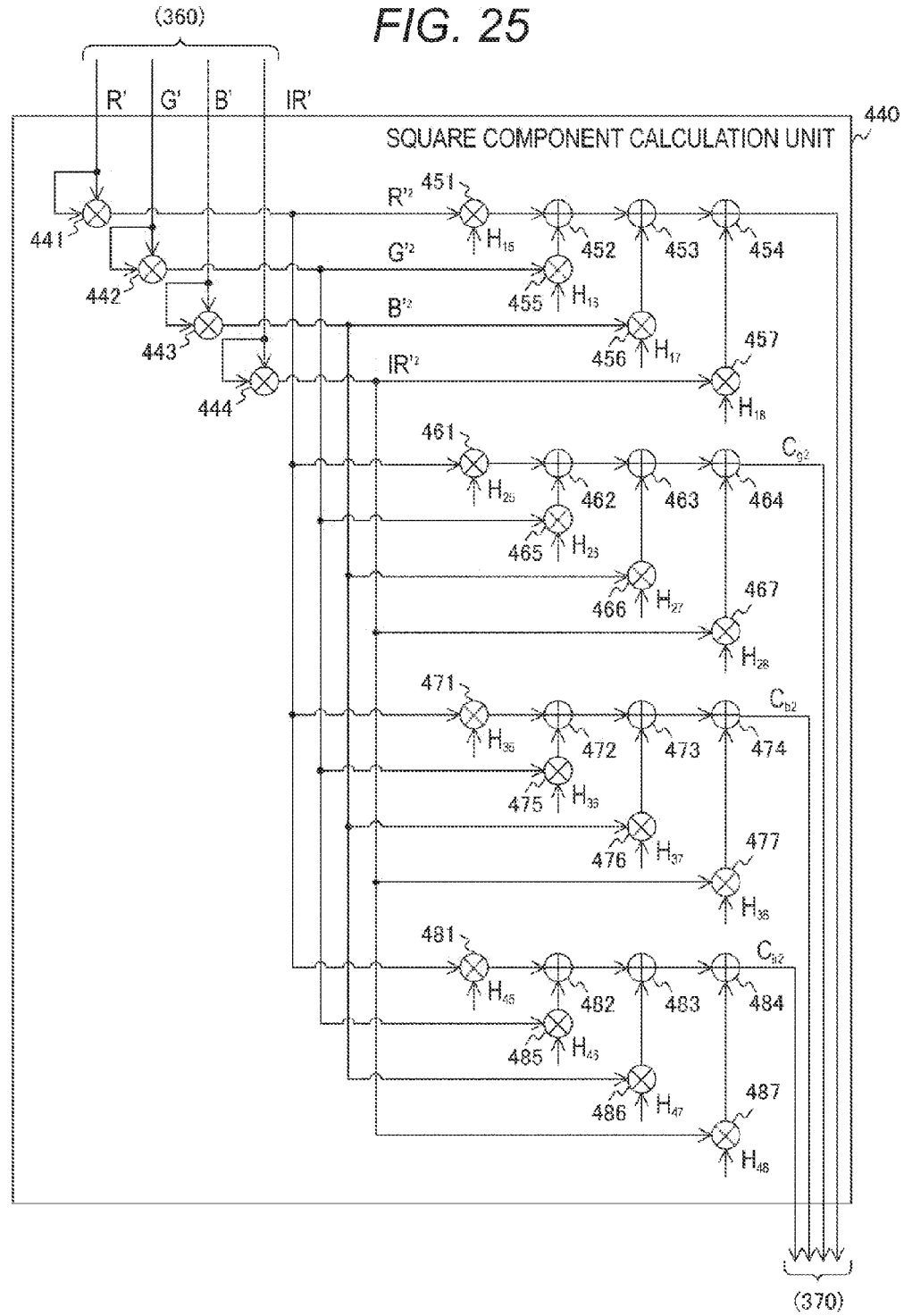
FIG. 25 is a view illustrating a configuration example of a square component calculation unit according to the third embodiment.

FIG. 25 is a view illustrating a configuration example of the square component calculation unit 440 according to the third embodiment. The square component calculation unit 440 includes multipliers 441, 442, 443, 444, 451, 455, 456, and 457, and adders 452, 453, and 454. The square component calculation unit 440 further includes multipliers 461, 465, 466, 467, 471, 475, 476, 477, 481, 485, 486, and 487, and adders 462, 463, 464, 472, 473, 474, 482, 483, and 484.

The multipliers 441 through 444 square R', G', B', and IR' to generate square components $R'^2$, $G'^2$, $B'^2$, and $IR'^2$. The square component $R'^2$ is supplied to the multipliers 451, 461, 471, and 481, while the square component $G'^2$ is supplied to the multipliers 455, 465, 475, and 485. On the other hand, the square component $B'^2$ is supplied to the multipliers 456, 466, 476, and 486, while the square component $IR'^2$ is supplied to the multipliers 457, 467, 477, and 487.

The multipliers 451, 455, 456, and 457, and the adders 452, 453, and 454 perform weighted summation of $R'^2$, $G'^2$, $B'^2$, and $IR'^2$ by coefficients $H_{15}$, $H_{16}$, $H_{17}$, and $H_{18}$. A result of summation $C_{r2}$ thus obtained is supplied to the high dimension component adding unit 370.

The multipliers 461, 465, 466, and 467, and the adders 462, 463, and 464 perform weighted summation of $R'^2$, $G'^2$, $B'^2$, and $IR'^2$ by coefficients $H_{25}$, $H_{26}$, $H_{27}$, and $H_{28}$. A result of summation $C_{g2}$ thus obtained is supplied to the high dimension component adding unit 370.

The multipliers 471, 475, 476, and 477, and the adders 472, 473, and 474 perform weighted summation of $R'^2$, $G'^2$, $B'^2$, and $IR'^2$ by coefficients $H_{35}$, $H_{36}$, $H_{37}$, and $H_{38}$. A result of summation $C_{b2}$ thus obtained is supplied to the high dimension component adding unit 370.

The multipliers 481, 485, 486, and 487, and the adders 482, 483, and 484 perform weighted summation of $R'^2$, $G'^2$, $B'^2$, and $IR'^2$ by coefficients $H_{45}$, $H_{46}$, $H_{47}$, and $H_{48}$. A result of summation $C_{ir2}$ thus obtained is supplied to the high dimension component adding unit 370.

Figure 26:
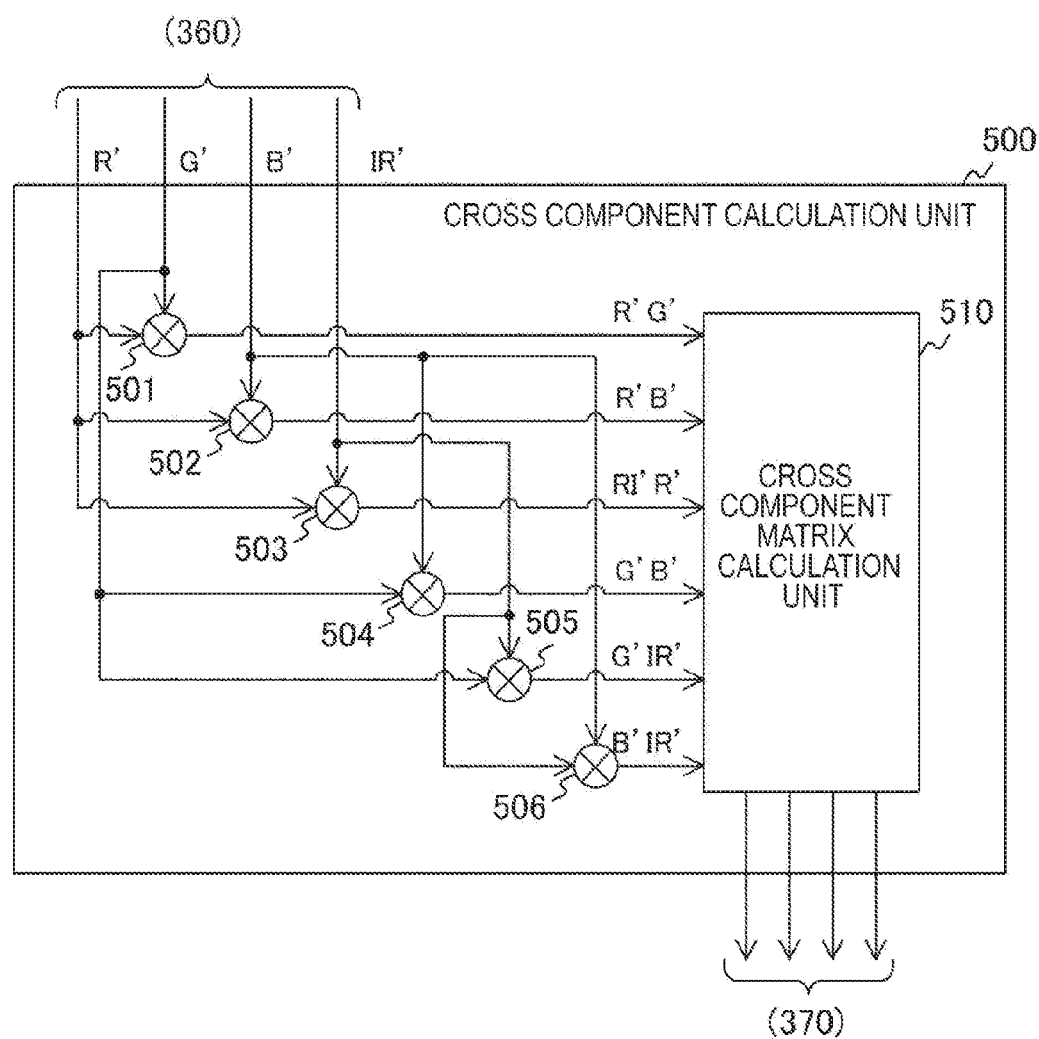
FIG. 26 is a view illustrating a configuration example of a cross component calculation unit according to the third embodiment.

FIG. 26 is a view illustrating a configuration example of the cross component calculation unit 500 according to the third embodiment. The cross component calculation unit 500 includes multipliers 501 through 506, and a cross component matrix calculation unit 510.

The multiplier 501 multiplies R' by G' to generate a cross component R'G', and supplies the cross component R'G' to the cross component matrix calculation unit 510. The multiplier 502 multiplies R' by B' to generate a cross component R'B', and supplies the cross component R'B' to the cross component matrix calculation unit 510. The multiplier 503 multiplies RI' by R' to generate a cross component R' IR', and supplies the cross component R' IR' to the cross component matrix calculation unit 510.

In addition, the multiplier 504 multiplies G' by B' to generate a cross component G' B', and supplies the cross component G'B' to the cross component matrix calculation unit 510. The multiplier 505 multiplies G' by IR' to generate a cross component G' IR', and supplies the cross component G' IR' to the cross component matrix calculation unit 510. The multiplier 506 multiplies B' by IR' to generate a cross component B' IR', and supplies the cross component B' IR' to the cross component matrix calculation unit 510.

The cross component matrix calculation unit 510 performs a matrix operation for cross components by using a 4-row×6-column matrix.

Figure 27:
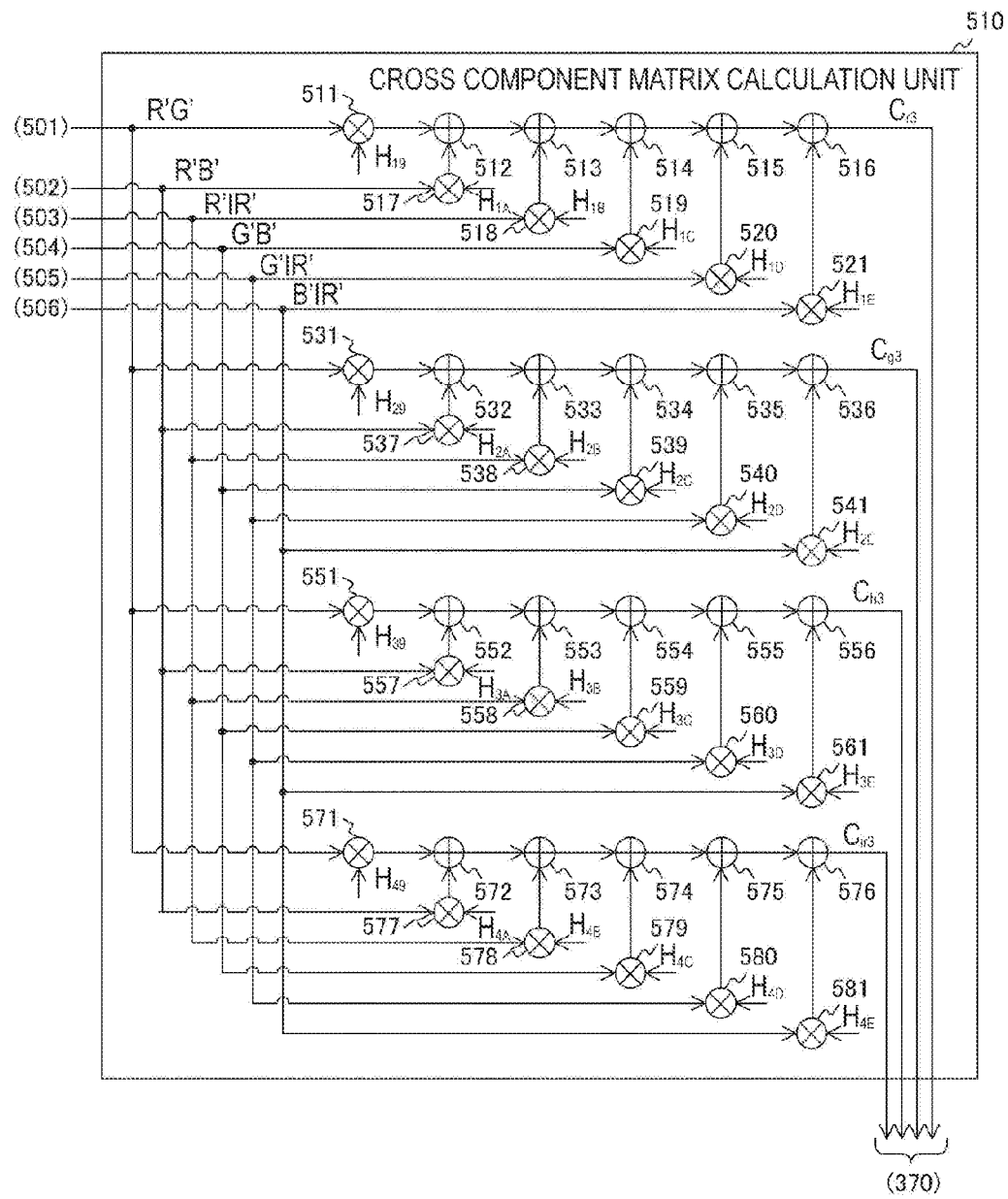
FIG. 27 is a view illustrating a configuration example of a cross component matrix calculation unit according to the third embodiment.

FIG. 27 is a view illustrating a configuration example of the cross component matrix calculation unit 510 according to the third embodiment. The cross component matrix calculation unit 510 includes multipliers 511, 517, 518, 519, 520, and 521, and adders 512, 513, 514, 515, and 516. The cross component matrix calculation unit 510 further includes multipliers 531, 537, 538, 539, 540, and 541, and adders 532, 533, 534, 535, and 536. The cross component matrix calculation unit 510 further includes multipliers 551, 557, 558, 559, 560, and 561, and adders 552, 553, 554, 555, and 556. The cross component matrix calculation unit 510 further includes multipliers 571, 577, 578, 579, 580, and 581, and adders 572, 573, 574, 575, and 576.

The multipliers 511, 517, 518, 519, 520, and 521, and the adders 512, 513, 514, 515, and 516 perform weighted summation of respective cross components by coefficients $H_{19}$ through $H_{1E}$. A result of summation $C_{r3}$ thus obtained is supplied to the high dimension component adding unit 370.

The multipliers 531, 537, 538, 539, 540, and 541, and the adders 532, 533, 534, 535, and 536 perform weighted summation of respective cross components by coefficients $H_{29}$ through $H_{2E}$. A result of summation $C_{g3}$ thus obtained is supplied to the high dimension component adding unit 370.

The multipliers 551, 557, 558, 559, 560, and 561, and the adders 552, 553, 554, 555, and 556 perform weighted summation of respective cross components by coefficients $H_{39}$ through $H_{3E}$. A result of summation $C_{b3}$ thus obtained is supplied to the high dimension component adding unit 370.

The multipliers 571, 577, 578, 579, 580, and 581, and the adders 572, 573, 574, 575, and 576 perform weighted summation of respective cross components by coefficients $H_{49}$ through $H_{4E}$. A result of summation $C_{ir3}$ thus obtained is supplied to the high dimension component adding unit 370.

Figure 28:
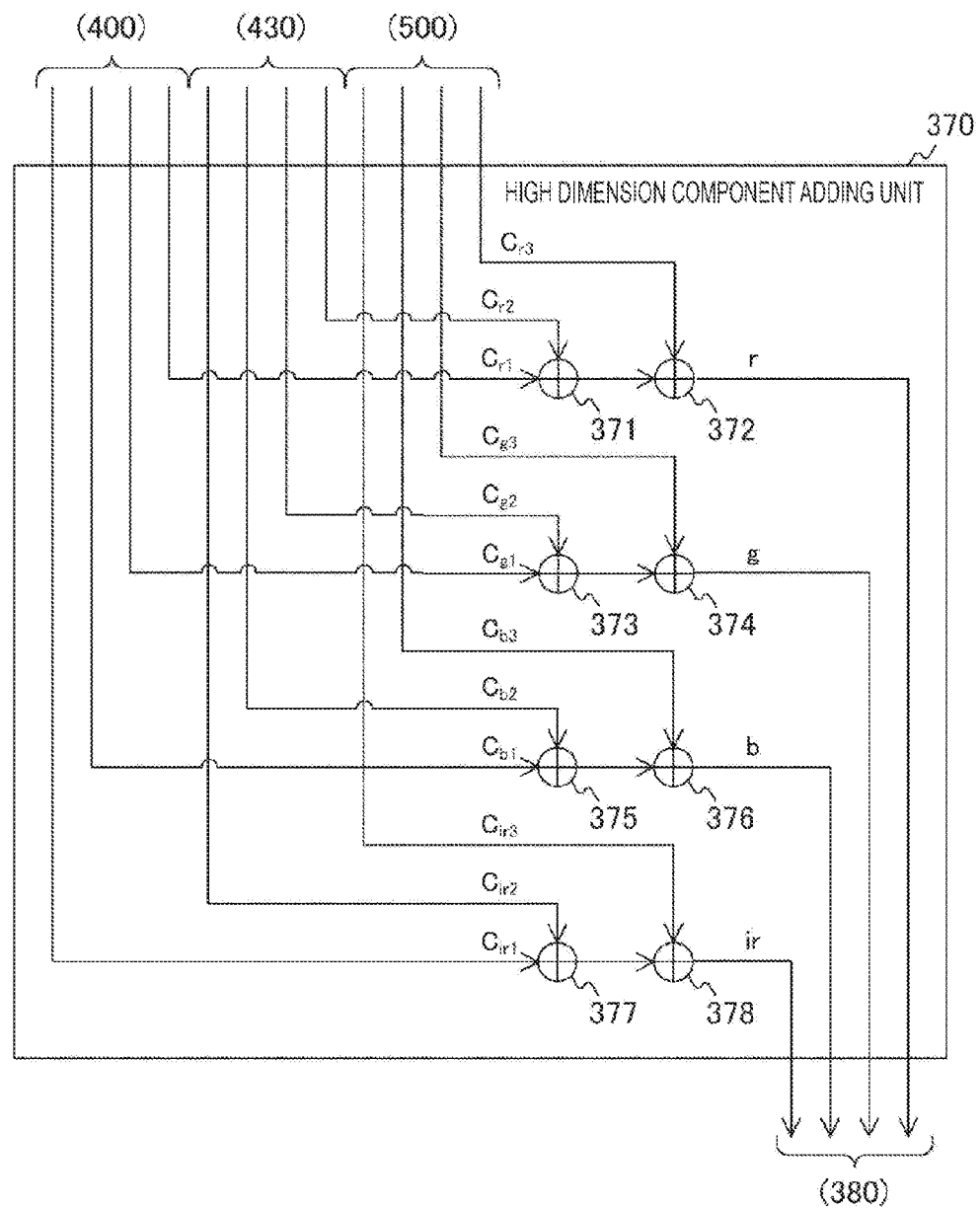
FIG. 28 is a view illustrating a configuration example of a high dimension component adding unit according to the third embodiment.

FIG. 28 is a view illustrating a configuration example of the high dimension component adding unit 370 according to the third embodiment. The high dimension component adding unit 370 includes adders 371 through 378.

The adders 371 and 372 sum the result of summation $C_{r1}$, $C_{r2}$, and $C_{r3}$, and supply a result of summation thus calculated to the inverse normalization unit 380 as a high accuracy component r. The adders 373 and 374 sum the result of summation $C_{g1}$, $C_{g2}$, and $C_{g3}$, and supply a result of summation thus calculated to the inverse normalization unit 380 as a high accuracy component g.

In addition, the adders 375 and 376 sum the result of summation $C_{b1}$, $C_{b2}$, and $C_{b3}$, and supply a result of summation thus calculated to the inverse normalization unit 380 as a high accuracy component b. The adders 377 and 378 sum the result of summation $C_{ir1}$ $C_{ir2}$, and $C_{ir3}$, and supply a result of summation thus calculated to the inverse normalization unit 380 as a high accuracy component ir.

As described above, the imaging device 100 in the third embodiment of the present technology corrects visible light components, infrared light components, square components, and cross components by weighted summation. Accordingly, accuracy of visible light components and infrared light components further improves.

[Modified Example]

While infrared light components and visible light components are generated by using the 4-row×14-column matrix in the third embodiment, the matrix to be used may be further extended. The imaging device 100 according to a modified example of the third embodiment is different from the imaging device 100 in the third embodiment in that the matrix to be used is further extended.

FIG. 29 is a view illustrating an example of a calculation formula used by the infrared light separation unit 300 according to the modified example of the third embodiment. The infrared light separation unit 300 further generates cubic components R'²B', R'²G', R'²IR', G'²R', G'²B', G'²IR', B'²R', B'²G', B'²IR', IR'²R', IR'²G', and IR'²B'. Then, the infrared light separation unit 300 performs weighted summation of visible light components, infrared light components, square components, cross components, and cubic components to obtain r, g, b, and ir.

While the infrared light separation unit 300 generates all of square components, cross components, and cubic components, the infrared light separation unit 300 may generate only cubic components, or cubic components and either square components or cross components. Note that cubic components are an example of a high dimension component according to appended claims.

In addition, the infrared light separation unit 300 may generate components of a dimension higher than cubic components for weighted summation. For example, as the high dimension component of a dimension higher than cubic components, the fourth power of components are generated by multiplying the cubic components by R', G', B', and IR'.

As described above, the imaging device 100 in the modified example of the third embodiment achieves correction by additional weighted summation of cubic components. Accordingly, accuracy of visible light components and infrared light components further improves.

<4. Fourth Embodiment>

According to the first embodiment, coefficients in the imaging device 100 are determined and set beforehand. However, coefficients in the imaging device 100 may be determined by an information processing device additionally provided. An imaging system according to a fourth embodiment is different from the configuration of the first embodiment in that an information processing device for calculating coefficients is added.

Figure 30:
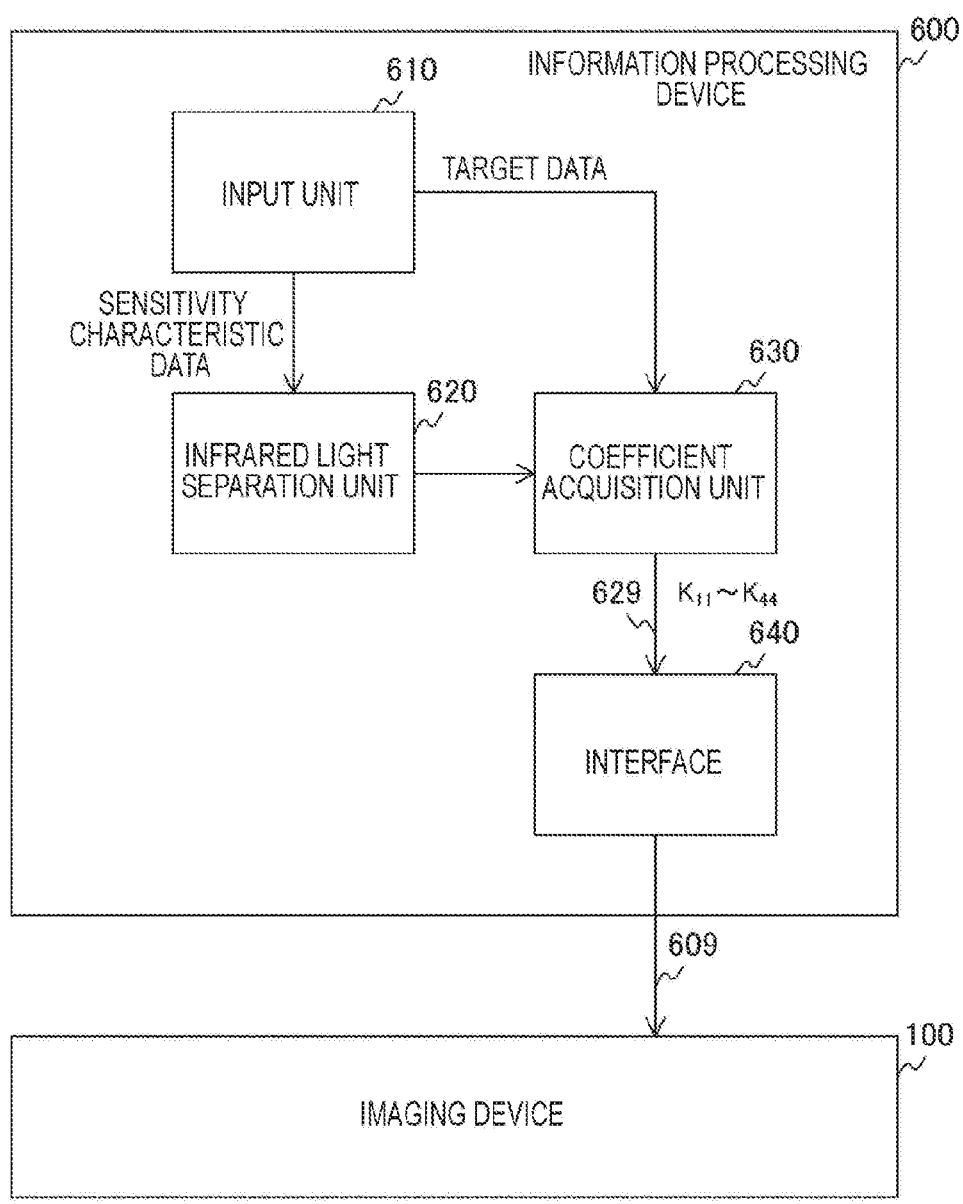
FIG. 30 is a block diagram illustrating a configuration example of an imaging system according to a fourth embodiment.

FIG. 30 is a block diagram illustrating a configuration example of the imaging system according to the fourth embodiment. This imaging system includes an information processing device 600 and the imaging device 100.

The information processing device 600 calculates coefficients used for weighted summation. The information processing device 600 includes an input unit 610, an infrared light separation unit 620, a coefficient acquisition unit 630, and an interface 640.

The input unit 610 inputs sensitivity characteristic data to the infrared light separation unit 620, and inputs target data to the coefficient acquisition unit 630. The sensitivity characteristic data in this context is data showing sensitivity characteristics for each pixel. For example, a sensitivity to light of a corresponding wavelength is input in a range from 350 nanometers to 1100 nanometers at intervals of 5 nanometers in a sensitivity characteristic curve illustrated in FIG. 12. In this case, 151 wavelength divisions are produced at intervals of 5 nanometers in the range from 350 nanometers to 1100 nanometers. The sensitivity characteristic data contains each sensitivity for 151 wavelength divisions for each of the R pixel, G pixel, B pixel, and W pixel. Accordingly, 151×4 sensitivities are input. Note that wavelength resolution is not limited to division by 5 nanometers. For example, resolution may be division by a length shorter than 5 nanometers to improve accuracy.

In addition, the target data is data showing ideal infrared light components and visible light components. For example, a sensitivity to light of a corresponding wavelength is input as a target sensitivity at intervals of 5 nanometers in the range from 350 nanometers to 1100 nanometers in an ideal sensitivity characteristic curve illustrated in FIG. 18.

Note that, while a sensitivity for each wavelength is input as the sensitivity characteristic data and the target data in this embodiment, other configurations may be adopted. For example, data containing a statistical amount such as a sum or an average of sensitivities for respective wavelengths in the sensitivity characteristic curve illustrated in FIG. 12 for each pixel may be input as the sensitivity characteristic data. Similarly, data containing a statistical amount such as a sum or an average of sensitivities for respective wavelengths in the sensitivity characteristic curve illustrated in FIG. 18 for each pixel may be input as the target data.

The configuration of the infrared light separation unit 620 is similar to the configuration of the infrared light separation unit 300 according to the first embodiment. The infrared light separation unit 620 replaces R, G, B, and IR in matrix expressions with output sensitivities $IRout_k$, $Rout_k$, $Gout_k$, and $Bout_k$, and calculates these output sensitivities for each wavelength by using the matrix in the part in FIG. 6a based on the sensitivity characteristic data. In this case, k represents a wavelength. The infrared light separation unit 620 supplies calculated output sensitivities to the coefficient acquisition unit 630. Note that the infrared light separation unit 620 is an example of a difference acquisition unit according to the appended claims.

The coefficient acquisition unit 630 calculates coefficients which minimize an error between an output sensitivity and a target sensitivity. For example, coefficients which minimize errors expressed in following formulae are calculated.

[Mathematical Formula 5]

$$R_{ERROR} = \sum_{k=350}^{1000} (Rtarget_k - Rout_k)^2 \quad \text{(Formula 33)}$$

[Mathematical Formula 6]

$$G_{ERROR} = \sum_{k=350}^{1000} (Gtarget_k - Gout_k)^2 \quad \text{(Formula 34)}$$

[Mathematical Formula 7]

$$B_{ERROR} = \sum_{k=350}^{1000} (Btarget_k - Bout_k)^2 \quad \text{(Formula 35)}$$

[Mathematical Formula 8]

$$IR_{ERROR} = \sum_{k=350}^{1000} (IRtarget_k - IRout_k)^2 \quad \text{(Formula 36)}$$

Coefficients $K_{11}$ through $K_{14}$ which minimize an error $R_{ERROR}$ are calculated by using Formula 33. Coefficients $K_{21}$ through $K_{24}$ which minimize an error $G_{ERROR}$ are calculated by using Formula 34. Moreover, coefficients $K_{31}$ through $K_{34}$ which minimize an error $B_{ERROR}$ are calculated by using Formula 35, while coefficients $K_{41}$ through $K_{44}$ which minimize an error $IR_{ERROR}$ are calculated by using Formula 36. The coefficient acquisition unit 630 supplies calculated coefficients to the imaging device 100 via the interface 640.

Note that while the information processing device 600 calculates coefficients on the basis of target data and sensitivity characteristic data, the coefficients $K_{41}$ through $K_{44}$ may be calculated only based on sensitivity characteristic data for each pixel in a visible light range (such as 350 nanometers to 650 nanometers). In this case, coefficients are determined such that a value obtained by weighted summation of sensitivities of the R, G, B, and W pixels in the visible light range by the coefficients becomes smaller than a tolerance. This tolerance is set to a sum obtained when $K_{41}$, $K_{42}$, $K_{43}$, and $K_{44}$ are set to 0.5, 0.5, 0.5, and −0.5, respectively, or a smaller value. It is preferable, however, that the information processing device 600 calculates coefficients on the basis of target data and sensitivity characteristic data from a viewpoint of improvement of accuracy.

In addition, while the information processing device 600 calculates coefficients which minimize errors, the information processing device 600 may calculate coefficients which produce errors not exceeding a set value. A set value for calculating $K_{11}$, $K_{12}$, $K_{13}$, and $K_{14}$ is set to a value smaller than the error $R_{ERROR}$ when $K_{11}$, $K_{12}$, $K_{13}$, and $K_{14}$ are set to 0.5, −0.5, −0.5, and 0.5, respectively. A set value for calculating $K_{21}$, $K_{22}$, $K_{23}$, and $K_{24}$ is set to a value smaller than the error $G_{ERROR}$ when $K_{21}$, $K_{22}$, $K_{23}$, and $K_{24}$ are set to −0.5, 0.5, −0.5, and 0.5, respectively. A set value for calculating $K_{31}$, $K_{32}$, $K_{33}$, and $K_{34}$ is set to a value smaller than the error $B_{ERROR}$ when $K_{31}$, $K_{32}$, $K_{33}$, and $K_{34}$ are set to −0.5, −0.5, 0.5, and 0.5, respectively. A set value for calculating $K_{41}$, $K_{42}$, $K_{43}$, and $K_{44}$ is set to a value smaller than the error $IR_{ERROR}$ when $K_{41}$, $K_{42}$, $K_{43}$, and $K_{44}$ are set to 0.5, 0.5, 0.5, and −0.5, respectively. It is preferable, however, that the information processing device 600 calculates coefficients which minimize respective errors from a viewpoint of improvement of accuracy.

In addition, while the infrared light separation unit 620 has the same configuration as the corresponding configuration in the first embodiment, the infrared light separation unit 620 may have the same configuration as the corresponding configuration in the second embodiment. In this case, the coefficients $K_{11}$ through $K_{41}$, and the coefficients Kr, Kg, and Kb are calculated. In addition, the infrared light separation unit 620 may have the same configuration as the corresponding configuration in the third embodiment. In this case, the respective coefficients in the matrix shown in FIG. 20 are calculated.

Figure 31:
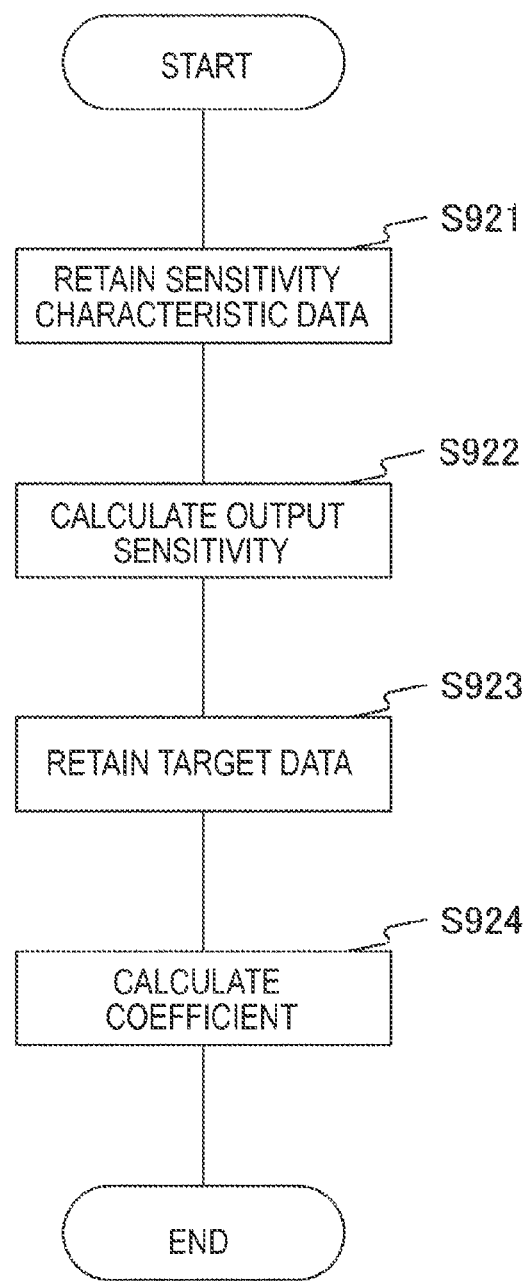
FIG. 31 is a flowchart showing an example of an operation performed by an imaging device according to the fourth embodiment.

FIG. 31 is a flowchart showing an example of an action of the information processing device 600 according to the fourth embodiment. This action starts in response to a start of execution of a predetermined application for calculating coefficients, for example.

When receiving sensitivity characteristic data, the information processing device 600 retains the received data in a memory or the like (step S921). Then, the information processing device 600 calculates output sensitivities by weighted summation (step S922). On the other hand, when receiving target data, the information processing device 600 retains the data in a memory or the like (step S923). The information processing device 600 calculates coefficients which minimize errors between targets within the target data and the output sensitivities (step S924). After step S924, the information processing device 600 ends calculation of coefficients.

As described above, the information processing device 600 in the fourth embodiment of the present technology calculates coefficients which minimize errors between target sensitivities and values obtained by weighted summation of output sensitivities of pixels. Accordingly, the imaging device 100 is capable of accurately separating infrared light components by using these coefficients.

Note that the respective embodiments described above are presented by way of examples for realizing the present technology. Matters included in the embodiments, and specific matters of the invention according to the appended claims are correlated with each other. Similarly, the specific matters of the invention according to the appended claims, and matters to which identical names are given in the embodiments of the present technology are correlated with each other. However, the present technology is not limited to the embodiments herein, but may be realized with various modifications of the embodiments without departing from the subject matters of the embodiments.

In addition, the processing procedures described in the foregoing embodiments may be considered as a method including a series of these procedures, as a program under which a computer executes the series of procedures, or as a recording medium in which the program is stored. The recording medium may be constituted by a compact disc (CD), a minidisc (MD), a digital versatile disc (DVD), a memory card, a Blu-ray (registered trademark) disc, or others.

Effects to be produced are not limited to the effects described in the present specification presented only by way of example. Additional effects may be also produced.

Note that the present technology may have following configurations.

(1) An image processing device including:

an adding unit that generates a summed value corresponding to a sum of all values of respective pixel signals of a plurality of first pixels each of which has sensitivities to visible light and invisible light, wherein the values are weighted by first weighting coefficients that are different from each other and determined such that a difference between a sum of the sensitivities of the first pixels to the visible light and a sensitivity of a second pixel to the visible light, which second pixel has sensitivities to the visible light and the invisible light, becomes smaller than a predetermined tolerance in a state that the sensitivities of the first pixels to the visible light are weighted by the first weighting coefficients and that the sensitivity of the second pixel to the visible light is weighted by a second weighting coefficient;

a weighting processing unit that weights a pixel signal of the second pixel by the second weighting coefficient; and an invisible light component generation unit that generates, as a component of the invisible light within each of the pixel signals, a difference between the weighted pixel signal of the second pixel and the summed value.

(2) The image processing device according to (1) described above, further including a visible light component generation unit that generates a component of the visible light contained in each of the pixel signals of the plurality of first pixels on the basis of the pixel signal of the corresponding first pixel.

(3) The image processing device according to (2) described above, wherein the visible light component generation unit generates, as a component of the visible light contained in the pixel signal of a target pixel corresponding to any one of the plurality of first pixels, a signal obtained by weighted summation of the respective pixel signals of the plurality of first pixels and the second pixel by using third weighting coefficients that are different from each other and determined such that a difference between a sum of respective sensitivities of the plurality of first pixels and the second pixel to light containing the visible light and the invisible light and the sensitivity of the target pixel to the visible light becomes smaller than a predetermined set value in a state that the respective sensitivities of the first pixels and the second pixel to the light containing the visible light and the invisible light are weighted by the third weighting coefficients.

(4) The image processing device according to (2) described above, wherein the visible light component generation unit generates, as a component of the visible light, a difference between the pixel signal of a target pixel corresponding to any one of the plurality of first pixels and the component of the invisible light in a state that the component of the invisible light is weighted by a fourth weighting coefficient that increases as the sensitivity of the target pixel to the invisible light increases.

(5) The image processing device according to (2) or (3) described above, further including a correction unit that corrects the components of the visible light and the invisible light by a process for generating a high dimension component having a dimension higher than dimensions of the components of both the visible light and the visible light, and performing weighted summation of the high dimension component, the component of the invisible light, and the component of the visible light.

(6) The image processing device according to (5) described above, wherein the correction unit generates, as the high dimension component, at least either a squared value of the component of the invisible light or a squared value of the component of the visible light.

(7) The image processing device according to (5) or (6) described above, wherein the visible light component contains a plurality of color components, and the correction unit generates, as the high dimension component, a component obtained by multiplying one of a pair of components included in the component of the invisible light and the plurality of color components by the other component of the pair.

(8) The image processing device according to any one of (5) through (7) described above, wherein the correction unit generates, as the high dimension component, at least either a value obtained by multiplying a squared value of the component of the invisible light by the component of the visible light, or a value obtained by multiplying a squared value of the component of the visible light by the component of the invisible light.

(9) The image processing device according to claim 1, further including a detection unit that detects whether or not the pixel signal of the second pixel is larger than a predetermined threshold, and performs weighted summation of the pixel signal of the second pixel and the component of the invisible light component when the pixel signal of the second pixel is larger than the predetermined threshold.

(10) The image processing device according to any one of (1) through (9) described above, further including a luminance signal generation unit that generates, as a luminance signal, a difference between the pixel signal of the second pixel and a weighted value of the component of the invisible light.

(11) The image processing device according to any one of (1) through (10) described above, wherein
the plurality of first pixels contain a pixel that has a highest sensitivity to red light in the visible light, a pixel that has a highest sensitivity to green light in the visible light, and a pixel that has a highest sensitivity to blue light in the visible light, and
the second pixel is a pixel that has a highest sensitivity to white light in the visible light.

(12) An imaging device including:
an imaging unit that forms image data containing respective pixel signals of a plurality of first pixels having sensitivities to visible light and invisible light, and a pixel signal of a second pixel having sensitivity to the visible light and the invisible light;
an adding unit that generates a summed value corresponding to a sum of all values of the respective pixel signals of the plurality of first pixels, wherein the values are weighted by first weighting coefficients that are different from each other and determined such that a difference between a sum of the sensitivities of the first pixels to the visible light and the sensitivity of the second pixel to the visible light becomes smaller than a predetermined tolerance in a state that the sensitivities of the first pixels to the visible light are weighted by the first weighting coefficients and that the sensitivity of the second pixel to the visible light is weighted by a second weighting coefficient;
a weighting processing unit that weights the pixel signal of the second pixel by the second weighting coefficient; and
an invisible light component generation unit that generates, as a component of the invisible light within each of the pixel signals, a difference between the weighted pixel signal of the second pixel and the summed value.

(13) An information processing device including:
a difference acquisition unit that obtains, for a plurality of first pixels having sensitivities to visible light and invisible light and a second pixel having sensitivities to the visible light and the invisible light, a difference between a sum of the sensitivities of the first pixels to the visible light and the sensitivity of the second pixel to the visible light in a state that the sensitivities of the first pixels to the visible light are weighted by first weighting coefficients different from each other, and that the sensitivity of the second pixel is weighted by a second weighting coefficient; and
a coefficient acquisition unit that obtains the first and second weighting coefficients that produce the difference smaller than a predetermined tolerance.

(14) An information processing method including:
an adding process that causes an adding unit to generate a summed value corresponding to a sum of all values of respective pixel signals of a plurality of first pixels each of which has sensitivities to visible light and invisible light, wherein the values are weighted by first weighting coefficients that are different from each other and determined such that a difference between a sum of the sensitivities of the first pixels to the visible light and a sensitivity of a second pixel to the visible light, which second pixel has sensitivities to the visible light and the invisible light, becomes smaller than a predetermined tolerance in a state that the sensitivities of the first pixels to the visible light are weighted by the first weighting coefficients and that the sensitivity of the second pixel to the visible light is weighted by a second weighting coefficient;
a weighting process that causes a weighting processing unit to weight a pixel signal of the second pixel by the second weighting coefficient; and
an invisible light component generating process that causes an invisible light component generation unit to generate, as a component of the invisible light within each of the pixel signals, a difference between the weighted pixel signal of the second pixel and the summed value.

(15) A program under which a computer executes:
an adding process that causes an adding unit to generate a summed value corresponding to a sum of all values of respective pixel signals of a plurality of first pixels each of which has sensitivities to visible light and invisible light, wherein the values are weighted by first weighting coefficients that are different from each other and determined such that a difference between a sum of the sensitivities of the first pixels to the visible light and a sensitivity of a second pixel to the visible light, which second pixel has sensitivities to the visible light and the invisible light, becomes smaller than a predetermined tolerance in a state that the sensitivities of the first pixels to the visible light are weighted by the first weighting coefficients and that the sensitivity of the second pixel to the visible light is weighted by a second weighting coefficient;
a weighting process that causes a weighting processing unit to weight a pixel signal of the second pixel by the second weighting coefficient; and
an invisible light component generating process that causes an invisible light component generation unit to generate, as a component of the invisible light within each of the pixel signals, a difference between the weighted pixel signal of the second pixel and the summed value.

REFERENCE SIGNS LIST

100 Imaging device
110 Imaging lens
120 Optical filter
130 Imaging element
140 Recording unit
150 Control unit
160 Infrared light projector
170 Light measuring unit
200 Image processing unit
210 Low-frequency interpolation low-pass filter
220 High-frequency interpolation low-pass filter
230 White balance processing unit
240 Luminance signal generation unit
241 Switch
242, 311, 315, 316, 317, 321, 325, 326, 327, 329, 331, 335, 336, 337, 339, 341, 345, 346, 347, 349, 351, 353, 354,

356, 357, 359, 360, 401, 405, 406, 407, 411, 415, 416, 417, 421, 425, 426, 427, 431, 435, 436, 437, 441, 442, 443, 444, 451, 455, 456, 457, 461, 465, 466, 467, 471, 475, 476, 477, 481, 485, 486, 487, 501, 502, 503, 504, 505, 506, 511, 517, 518, 519, 520, 521, 531, 537, 538, 539, 540, 541, 551, 557, 558, 559, 560, 561, 571, 577, 578, 579, 580, 581 Multiplier
243, 328, 338, 348 Adder
250 Gamma correction unit
260 Chrominance signal generation unit
300, 620 Infrared light separation unit
310 Infrared light component generation unit
312, 313, 314, 322, 323, 324, 332, 333, 334, 342, 343, 352, 355, 358, 371, 372, 373, 374, 375, 376, 377, 378, 402, 403, 404, 412, 413, 414, 422, 423, 424, 432, 433, 434, 452, 453, 454, 462, 463, 464, 472, 473, 474, 482, 483, 484, 512, 513, 514, 515, 516, 532, 533, 534, 535, 536, 552, 553, 554, 555, 556, 572, 573, 574, 575, 576 Adder
320 Visible light component generation unit
350 Saturated pixel detection unit
360 Normalization unit
361 α value control unit
370 High dimension component adding unit
380 Inverse normalization unit
400 Normalized component calculation unit
440 Square component calculation unit
500 Cross component calculation unit
510 Cross component matrix calculation unit
600 Information processing device
610 Input unit
630 Coefficient acquisition unit
640 Interface

The invention claimed is:

1. An image processing device, comprising:
circuitry configured to:
receive a plurality of first pixel signals of a plurality of first pixels, wherein each of the plurality of first pixel signals includes a first light component that is sensitive to visible light and infrared light;
receive a second pixel signal of a second pixel, wherein the second pixel signal includes a second light component that is sensitive to the visible light and the infrared light;
determine, a first value of each of a plurality of first weight coefficients and a second value of a second weight coefficient, such that:
a first difference, between a sum of the first light component of each of the plurality of first pixel signals and the second light component of the second pixel, is less than a threshold value;
the first value of each of the plurality of first weight coefficients are unique; and
the second value of the second weight coefficient is unique,
wherein each of the plurality of first weight coefficients corresponds to a respective one of the plurality of first pixel signals, and
wherein the second weight coefficient corresponds to the second pixel signal;
generate a first summed value based on the first value and the second value,
wherein the first summed value corresponds to the sum of the first light component of each of the plurality of first pixel signals such that the first light component of each of the plurality of first pixel signals are weighted by the first weight coefficients;
weight a second light component of the second pixel by the second weight coefficient; and
extract, a third light component from each of the plurality of first pixel signals and the second pixel signal, based on the weighted second light component and the first summed value,
wherein the third light component is sensitive to the infrared light.

2. The image processing device according to claim 1, wherein the circuitry is further configured to extract a fourth light component that is sensitive to the visible light based on the plurality of first pixel signals of the plurality of first pixels.

3. The image processing device according to claim 2, wherein the circuitry is further configured to:
determine a third value of each of a plurality of third weight coefficients based on the sum of the first light component of each of the plurality of first pixel signals,
wherein the third value of each of the plurality of the plurality of third weight coefficients is unique;
generate a second summed value based on the third value of each of the plurality of third weight coefficients,
wherein the second summed value corresponds to a second sum of the first light component of each of the plurality of first pixel signals such that the first light component of each of the plurality of first pixel signals are weighted by the plurality of third weighting coefficients;
weight a second light component of the second pixel by one of the plurality of third weight coefficients; and
extract, based on the plurality of third weight coefficients, the fourth light component within a target pixel signal of a target pixel of the plurality of first pixels.

4. The image processing device according to claim 2, wherein the circuitry is further configured to:
generate the fourth light component based on a second difference between the first light component of a target pixel signal of a target pixel and the second light component of the second pixel,
wherein the target pixel signal corresponds to one of the plurality of first pixel signals,
wherein the second light component is weighed by a fourth weighting coefficient, and
wherein a fourth value of fourth weighting coefficient increase with an increase in the first light component of the target pixel signal.

5. The image processing device according to claim 2, wherein the circuitry is further configured to:
generate a high dimension component having a dimension higher than each of the third light component and the fourth light component; and
weight the high dimension component, the third light component, and the fourth light component.

6. The image processing device according to claim 5, wherein the circuitry is further configured to generate the high dimension component as a squared value of one of the third light component or the fourth light component.

7. The image processing device according to claim 5, wherein the circuitry is further configured to generate the high dimension component by multiplication of one of the plurality of first pixel signals with the third light component.

8. The image processing device according to claim 5, wherein the circuitry is further configured to generate the high dimension component one of:
multiplication of a squared value of the third light component and the fourth light component; or multiplication of a squared value of the fourth light component and the third light component.

9. The image processing device according to claim 1, wherein the circuitry is further configured to:
weight the second light component of the second pixel with the third light component based on a threshold value such that the second pixel signal of the second pixel is larger than the threshold value.

10. The image processing device according to claim 1, wherein the circuitry is further configured to:
generate as a luminance signal, a difference between the second light component of the second pixel and the third light component.

11. The image processing device according to claim 1, wherein the plurality of first pixel signals include
a first pixel that has a highest sensitivity to red light in the visible light,
a third pixel that has a highest sensitivity to green light in the visible light,
a fourth pixel that has a highest sensitivity to blue light in the visible light, and
the second pixel that has a highest sensitivity to white light in the visible light.

12. An imaging device, comprising:
circuitry configured to:
receive a plurality of first pixel signals of a plurality of first pixels, wherein each of the plurality of first pixel signals includes a first light component that is sensitive to visible light and infrared light;
receive a second pixel signal of a second pixel, wherein the second pixel signal includes a second light component that is sensitive to the visible light and the infrared light;
determine, a first value of each of a plurality of first weight coefficients and a second value of second weight coefficient, such that:
a first difference, between a sum of the first light component of each of the plurality of first pixel signals and the second light component of the second pixel, is less than a threshold value;
the first value of each of the plurality of first weight coefficients are unique; and
the second value of second weight coefficient is unique;
generate a first summed value based on the first value and the second value,
wherein the first summed value corresponds to the sum of the first light component of each of the plurality of first pixel signals such that the first light component of each of the plurality of first pixel signals are weighted by the first weight coefficients;
weight a second light component of the second pixel by the second weight coefficient;
extract, a third light component from each of the plurality of first pixel signals of first pixels and within the second pixel signal of a second pixel, based on the weighted second light component and the first summed value,
wherein the third light component is sensitive to the infrared light; and
generate an image comprising the plurality of first pixels and the second pixel.

13. An information processing device, comprising:
circuitry configured to:
determine, a first value of each of a plurality of first weight coefficients and a second value of a second weight coefficient,
wherein each of the plurality of first weight coefficients corresponds to a respective one of a plurality of first pixel signals,
wherein the second weight coefficient corresponds to a second pixel signal of a second pixel,
wherein the first value of each of the plurality of first weight coefficients is unique, and
wherein the second value of the second weight coefficient is unique; and
determine a difference between a sum of a first light component of each of the plurality of first pixel signals and a second light component of the second pixel such that the difference is less than a threshold value.

14. An information processing method, comprising:
in an image processing device:
receiving a plurality of first pixel signals of a plurality of first pixels, wherein each of the plurality of first pixel signals includes a first light component that is sensitive to visible light and infrared light;
receiving a second pixel signal of a second pixel, wherein the second pixel signal includes a second light component that is sensitive to the visible light and the infrared light;
determining, a first value of each of a plurality of first weight coefficients and a second value of second weight coefficient, such that:
a first difference, between a sum of the first light component of each of the plurality of first pixel signals and the second light component of the second pixel, is less than a threshold value;
the first value of each of the plurality of first weight coefficients are unique; and
the second value of second weight coefficient is unique,
wherein each of the plurality of first weight coefficients corresponds to a respective one of the plurality of first pixel signals, and
wherein the second weight coefficient corresponds to the second pixel signal;
generating a first summed value based on the first value and the second value,
wherein the first summed value corresponds to the sum of the first light component of each of the plurality of first pixel signals such that the first light component of each of the plurality of first pixel signals are weighted by the first weigh coefficients;
weighting a second light component of the second pixel by the second weight coefficient; and
extracting, a third light component from each of the plurality of first pixel signals and the second pixel signal, based on the weighted second light component and the first summed value,
wherein the third light component is sensitive to the infrared light.

15. A non-transitory computer-readable medium having stored thereon, computer-executable instructions which when executed by an image processing device, causes the image processing device to execute operations, the operations comprising:
receiving a plurality of first pixel signals of a plurality of first pixels, wherein each of the plurality of first pixel signals includes a first light component that is sensitive to visible light and infrared light;
receiving a second pixel signal of a second pixel, wherein the second pixel signal includes a second light component that is sensitive to the visible light and the infrared light;

determining, a first value of each of a plurality of first weight coefficients and a second value of a second weight coefficient, such that:
- a first difference, between a sum of the first light component of each of the plurality of first pixel signals and the second light component of the second pixel, is less than a threshold value;
- the first value of each of the plurality of first weight coefficients are unique; and
- the second value of the second weight coefficient is unique, wherein each of the plurality of first weight coefficients corresponds to a respective one of the plurality of first pixel signals, and wherein the second weight coefficient corresponds to the second pixel signal;

generating a first summed value based on the first value and the second value, wherein the first summed value corresponds to the sum of the first light component of each of the plurality of first pixel signals such that the first light component of each of the plurality of first pixel signals are weighted by the first weigh coefficients;

weighting a second light component of the second pixel by the second weigh coefficient; and extracting, a third light component from each of the plurality of first pixel signals and the second pixel signal, based on the weighted second light component and the first summed value, wherein the third light component is sensitive to the infrared light.

* * * * *